United States Patent [19]

Boström

[11] Patent Number: 4,516,669
[45] Date of Patent: May 14, 1985

[54] GEAR SHIFTING DEVICE

[76] Inventor: Karl J. Boström, 24 Vretgatan, Skellefteå S-931 33, Sweden

[21] Appl. No.: 333,857

[22] PCT Filed: Apr. 13, 1981

[86] PCT No.: PCT/SE81/00113
§ 371 Date: Dec. 10, 1981
§ 102(e) Date: Dec. 10, 1981

[87] PCT Pub. No.: WO81/03000
PCT Pub. Date: Oct. 29, 1981

[30] Foreign Application Priority Data

Apr. 14, 1980 [SE] Sweden .............................. 8002794
Sep. 30, 1980 [SE] Sweden .............................. 8006835

[51] Int. Cl.³ ............................................. B60K 41/22
[52] U.S. Cl. ..................................... 192/3.58; 74/868
[58] Field of Search ............... 192/3.57, 3.58, 3.51, 192/3.52, 3.54, 3.61, 3.62, 3.63, 109 F; 74/473 R, 866, 665 D, 867, 868, 869; 92/138

[56] References Cited

U.S. PATENT DOCUMENTS

| | | | |
|---|---|---|---|
| 3,298,483 | 1/1967 | Morrison | 192/3.58 |
| 3,667,577 | 6/1972 | Weymann | 192/3.58 |
| 3,945,265 | 3/1976 | Bell et al. | 192/3.58 |
| 4,234,066 | 11/1980 | Toyota et al. | 192/3.58 |
| 4,344,514 | 8/1982 | Fujihara et al. | 192/3.58 |

Primary Examiner—George H. Krizmanich
Attorney, Agent, or Firm—Cushman, Darby & Cushman

[57] ABSTRACT

In order to simplify and facilitate gear shifting, the present gear shifting device is equipped with a side position cylinder (2a,202) with a piston rod (11,203), which is connected to the shifter of the gearbox and movable to different predetermined positions for adjusting the shifter to a side position point corresponding to the selected gear, and a shift point cylinder (2b,204) with a piston rod (14,205), which is connected to the shifter of the gearbox and movable to different positions for moving the shifter to a shift point corresponding to the selected gear by swinging the shifter in one direction or the other, and provision is made to prevent the movement of the piston rods until declutching has taken place and to prevent return of the clutch to traction position until the gear has been engaged in the gearbox.

10 Claims, 33 Drawing Figures

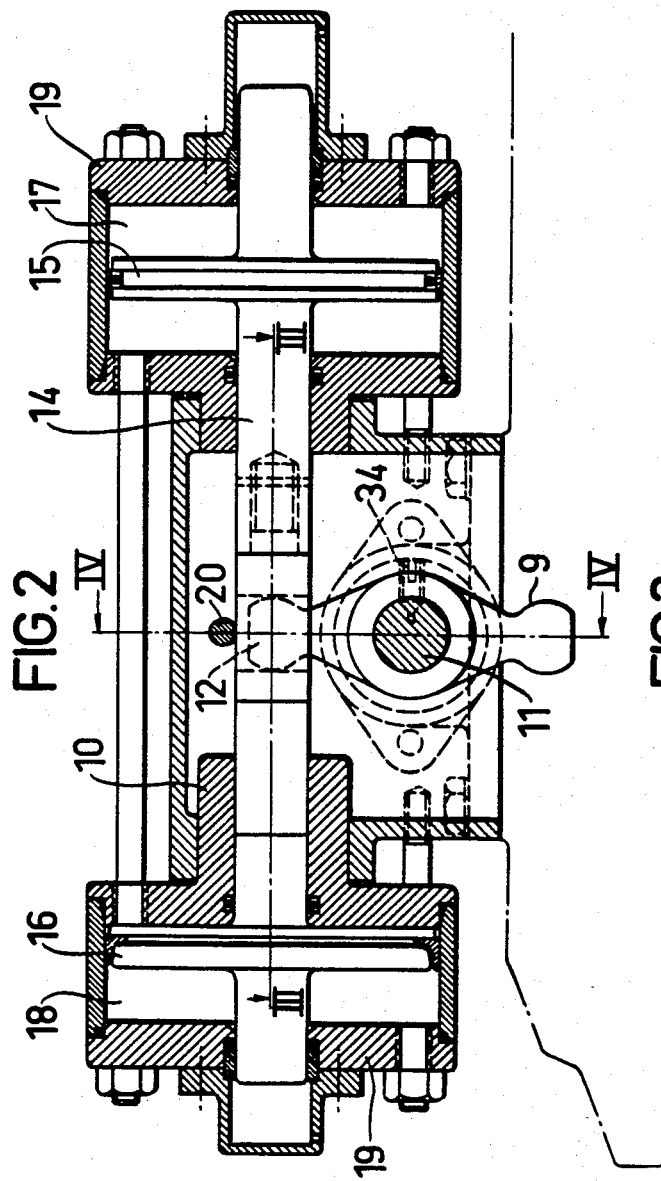
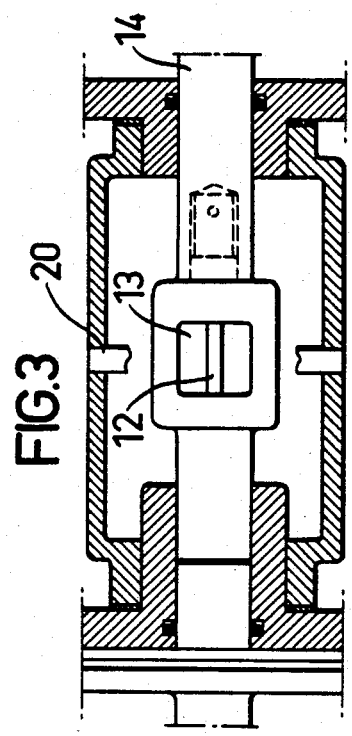

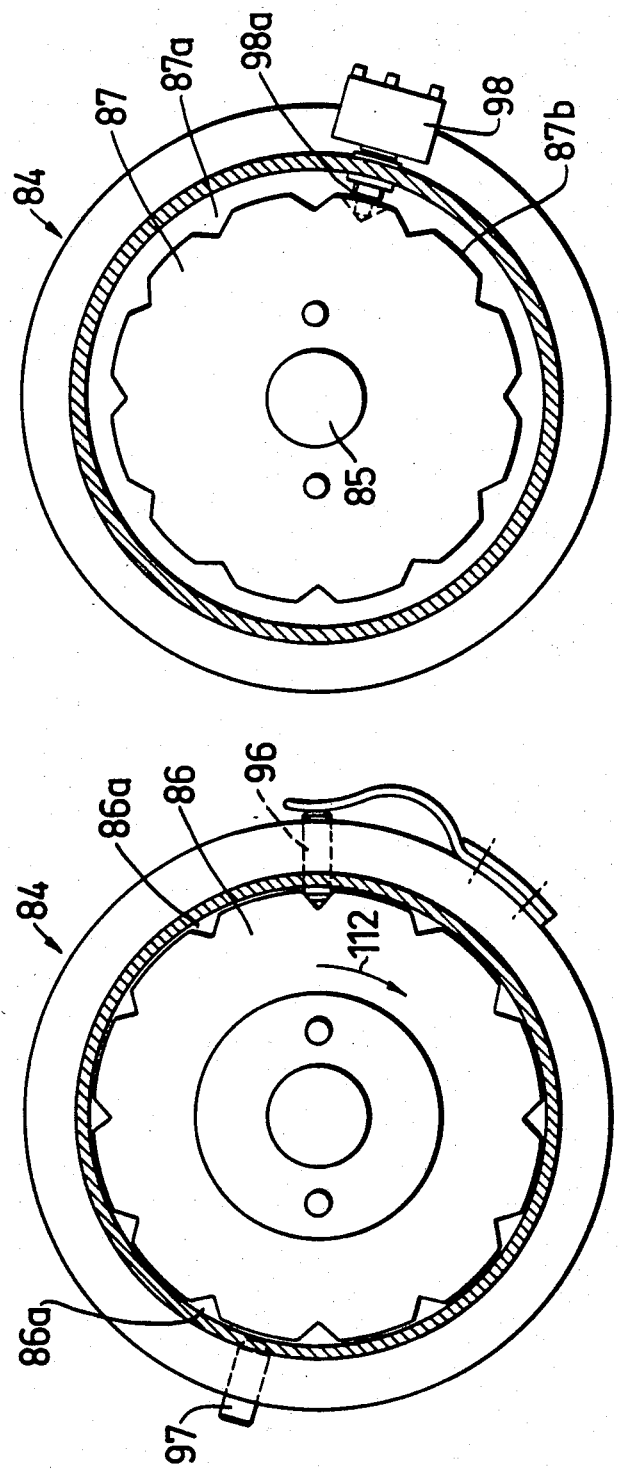

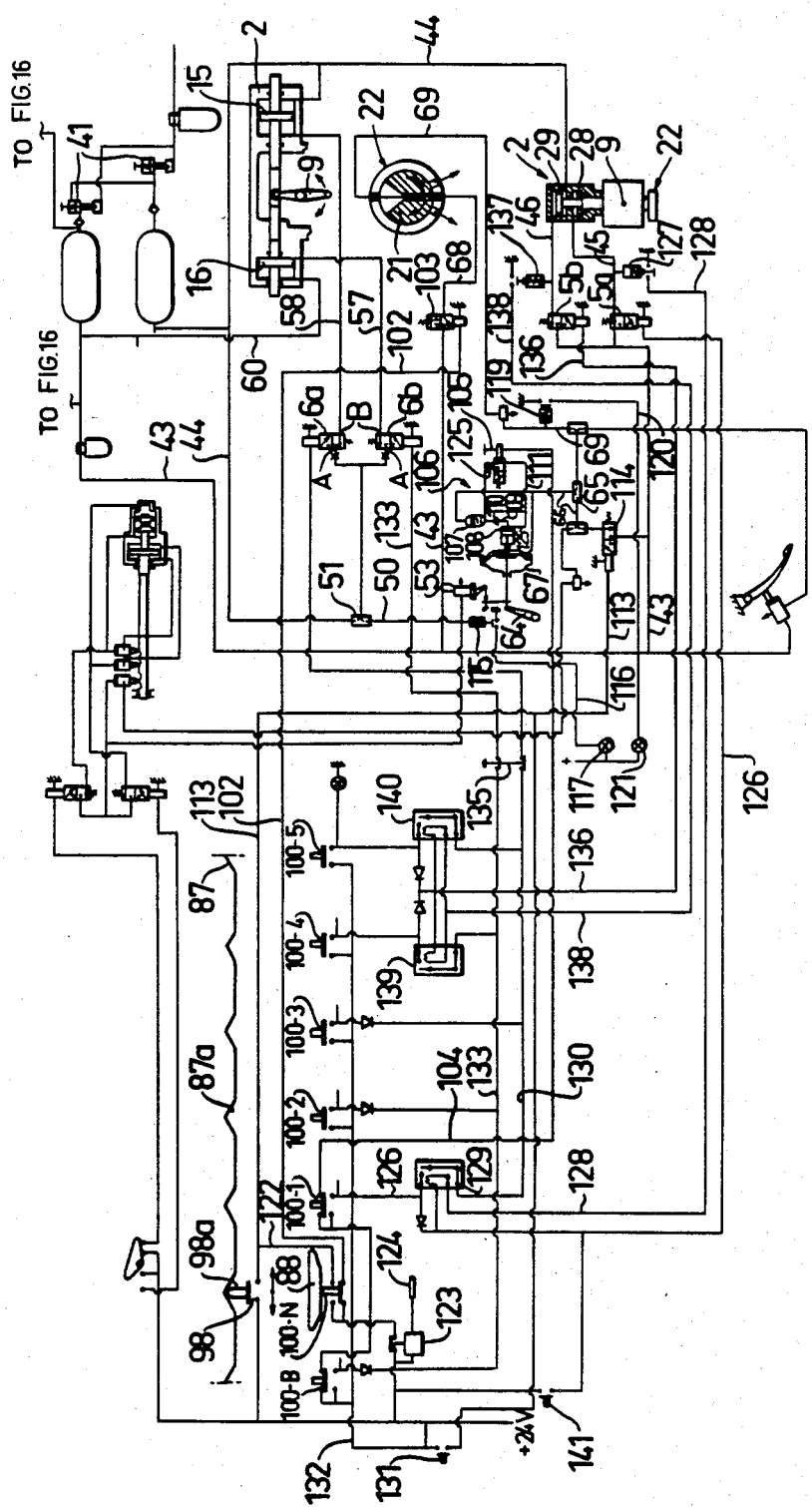

FIG.17

GEAR SHIFTING DEVICE

This invention relates to a gear shifting device for manual gearboxes, comprising a range selector control for at least engaging the reverse gear and a forward gear and neutral position, and a shifter arm coupled together with the shifter of the gearbox and operated through the range selector control.

When transport vehicles, for example heavily loaded trucks and buses, are driven, especially in city traffic, the driver perpetually must kick up and down for adapting the tractive power and speed to the prevailing and constantly changing conditions. Vehicles of this type normally are equipped with a manual gearbox, and each shifting of gear, thus, is carried out manually. The shifting of gear in manual gearboxes, however, requires relatively great force, which can amount to 38 kp, and which the driver has to invest for each shifting operation. As such shifting operations at times must be effected several times per minute, it is easily understood that the shifting can be a very tiresome and exacting work for the driver of a vehicle with manual gearbox.

In order to avoid the tiresome gear shifting, especially in buses and similar vehicles it has been commenced to replace the manual gearbox by an automatic one. The known automatic gearboxes, however, have the disadvantage that they increase the fuel consumption, in some cases by at least 10%.

The present invention, therefore, in principle has the object to provide a device, which facilitates the gear shifting of manual gearboxes substantially, and which further is constructed so as to render possible the pre-shifting of a higher or lower gear, semi-automatic or fully automatic shifting with manual gearboxes known per se, and which further is of such design that it can be mounted in a simple and easy manner, without much interference, even in existing vehicles, for example trucks, buses, passenger cars, tractors and other working vehicles with manual gearbox.

This object is achieved, in that the gear shifting device according to the present invention has been given the characterizing features defined in the attached claims.

The invention is described in greater detail in the following, with reference to the accompanying drawings, in which FIG. 1 shows from above an embodiment of the gear shifting device according to the invention mounted in a vehicle with manual gearbox and coupled to its ordinary gear shift lever, for manual shifting or shifting with preselection of the gears, FIG. 2 is a longitudinal section through the gear shifting cylinder of FIG. 1;

FIG. 3 is a section along the line III—III in FIG. 2,

Figure 7:
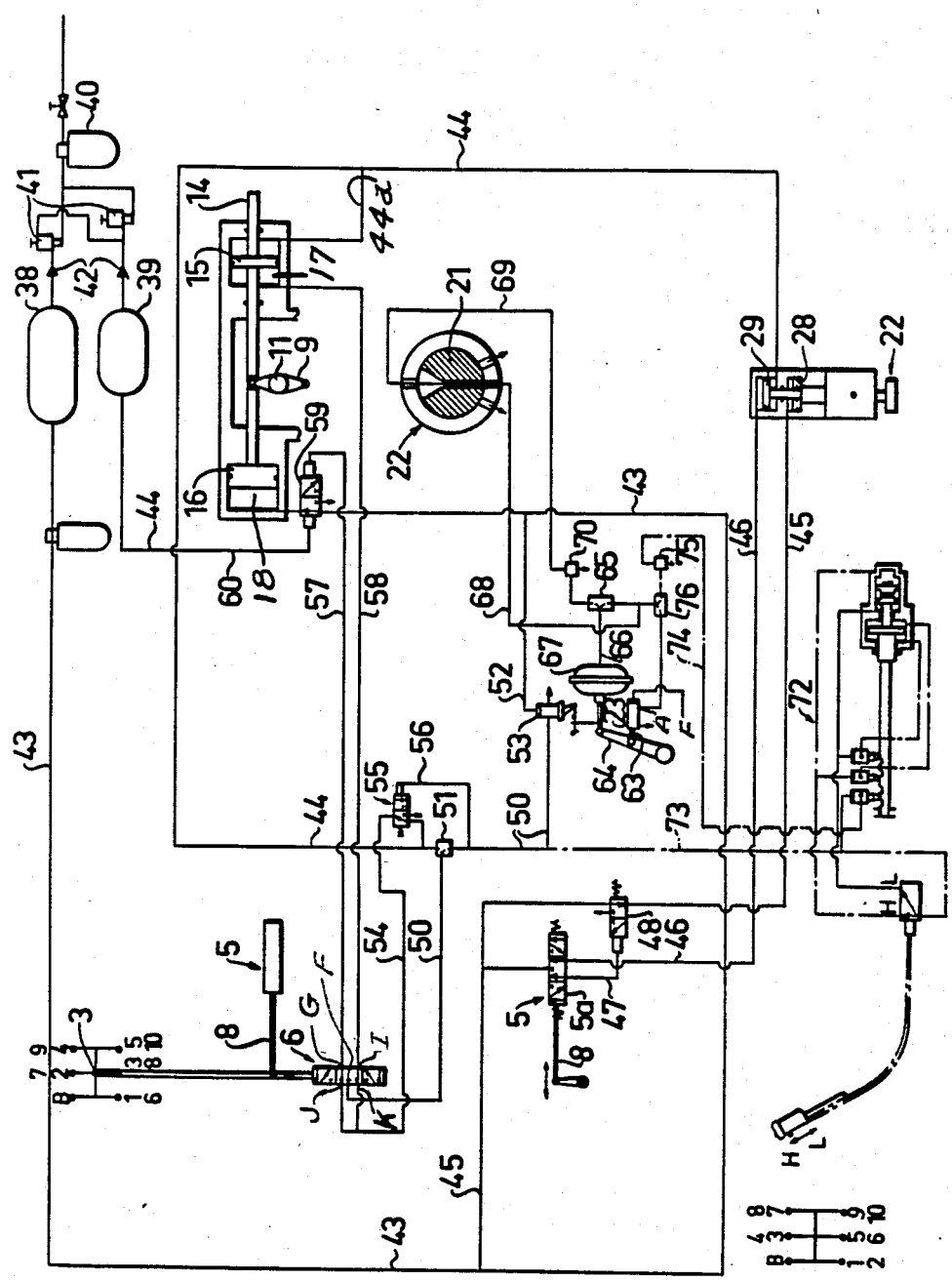
Figure 8A:
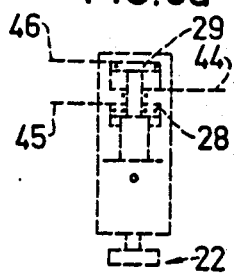
Figure 8B:
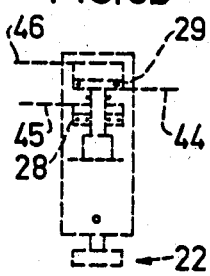
Figure 8C:
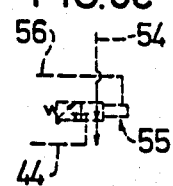
Figure 8D:
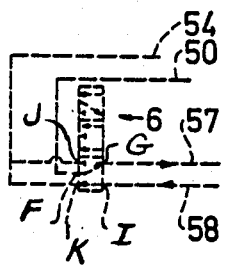
Figure 8F:
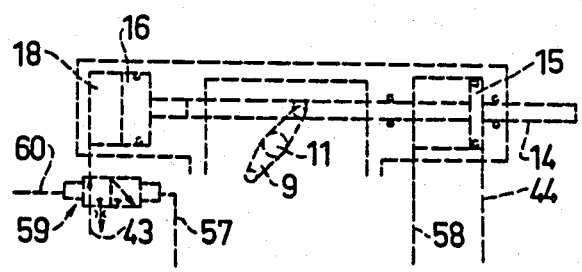
Figure 8E:
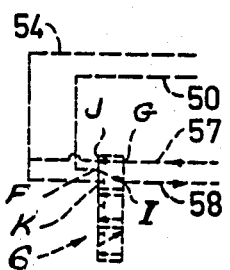
Figure 8G:
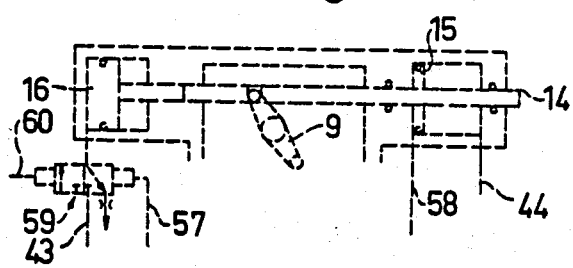
Figure 8H:
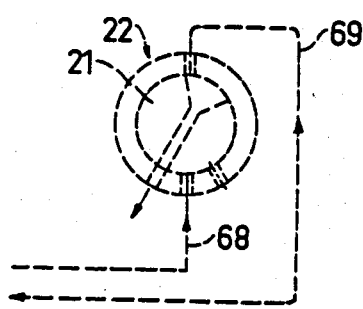
Figure 8I:
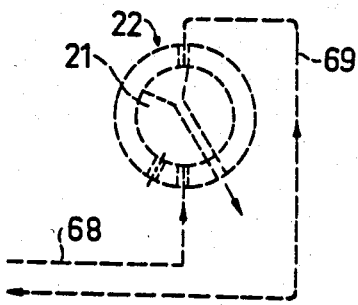
Figure 9:
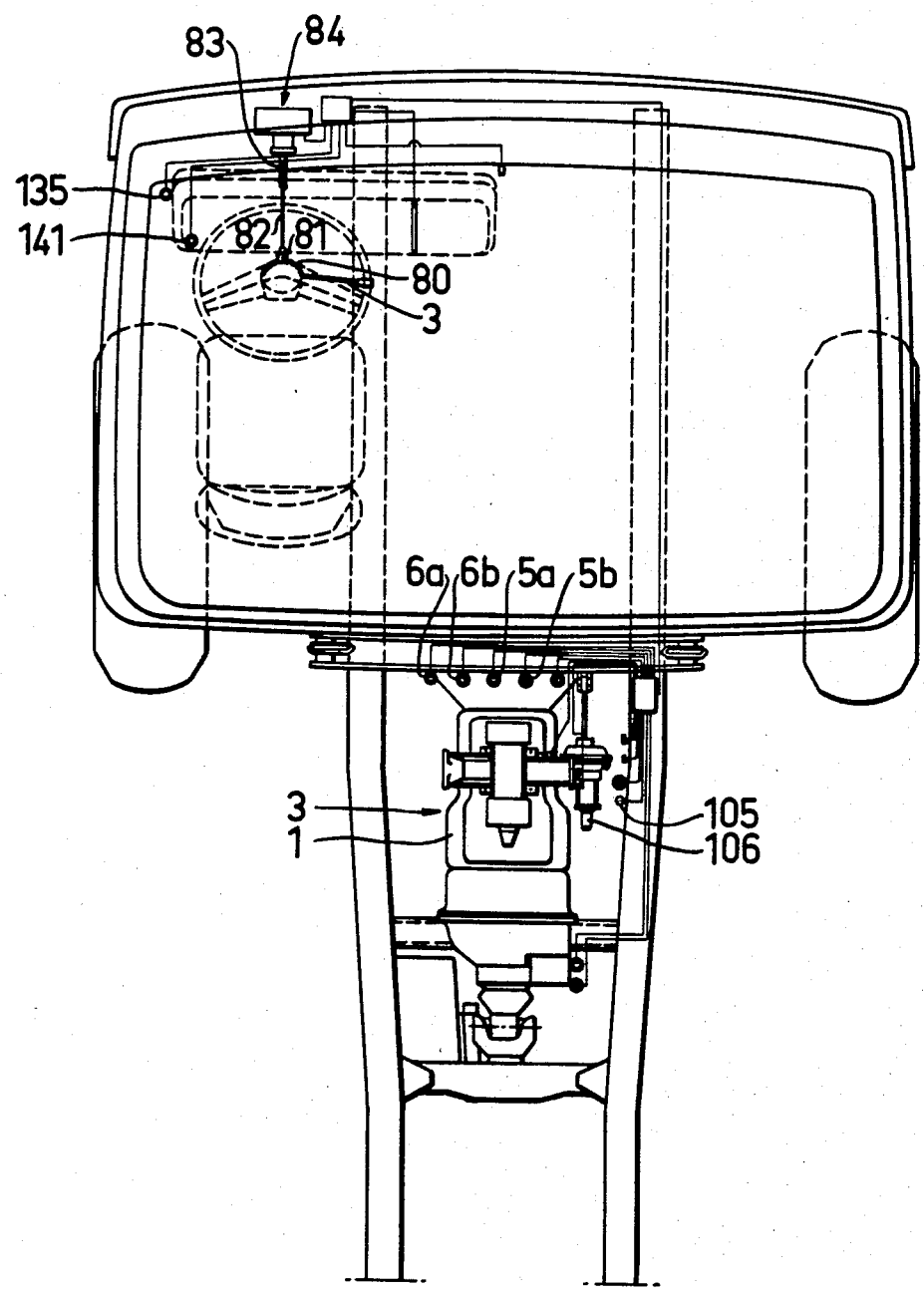
Figure 10:
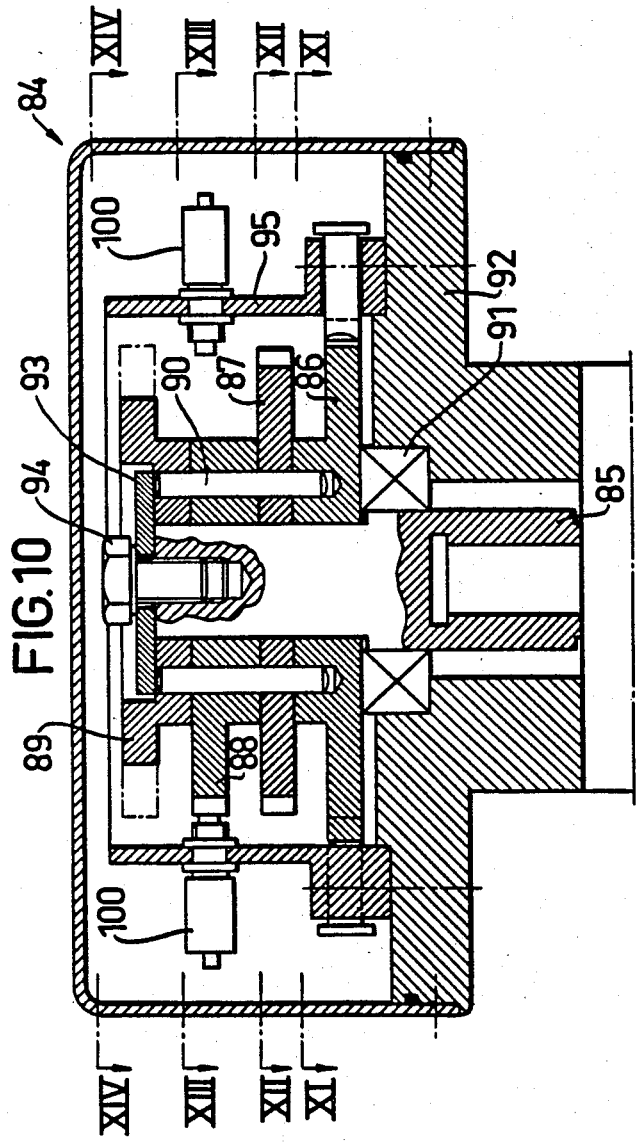
Figure 18:
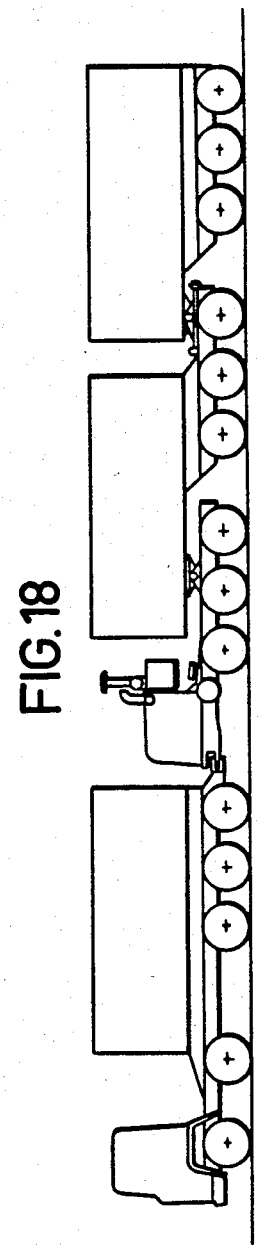
Figure 14:
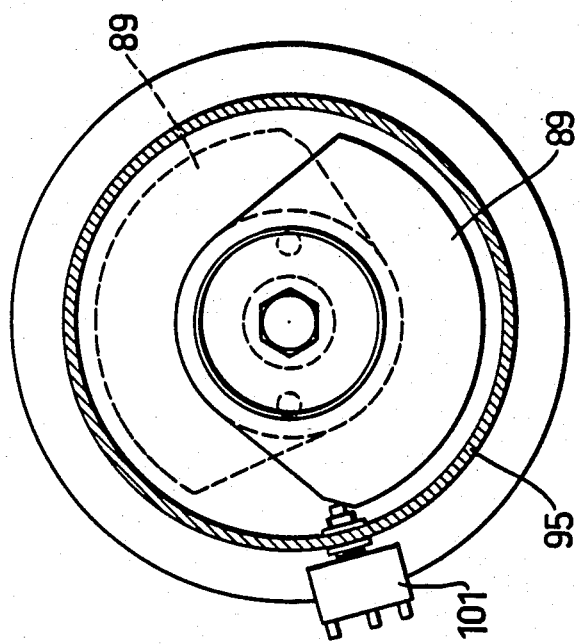
Figure 13:
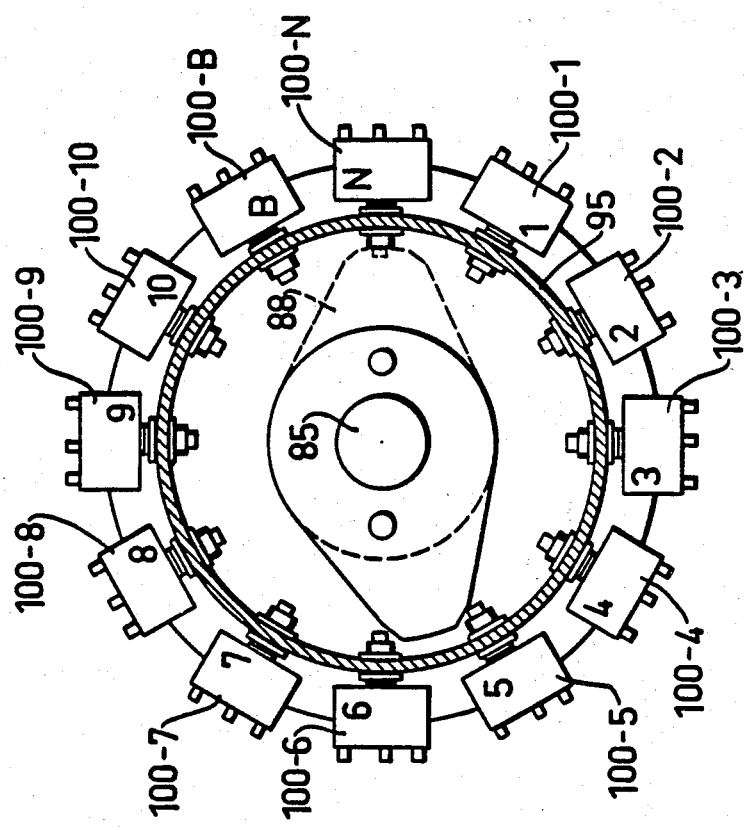
Figure 16:
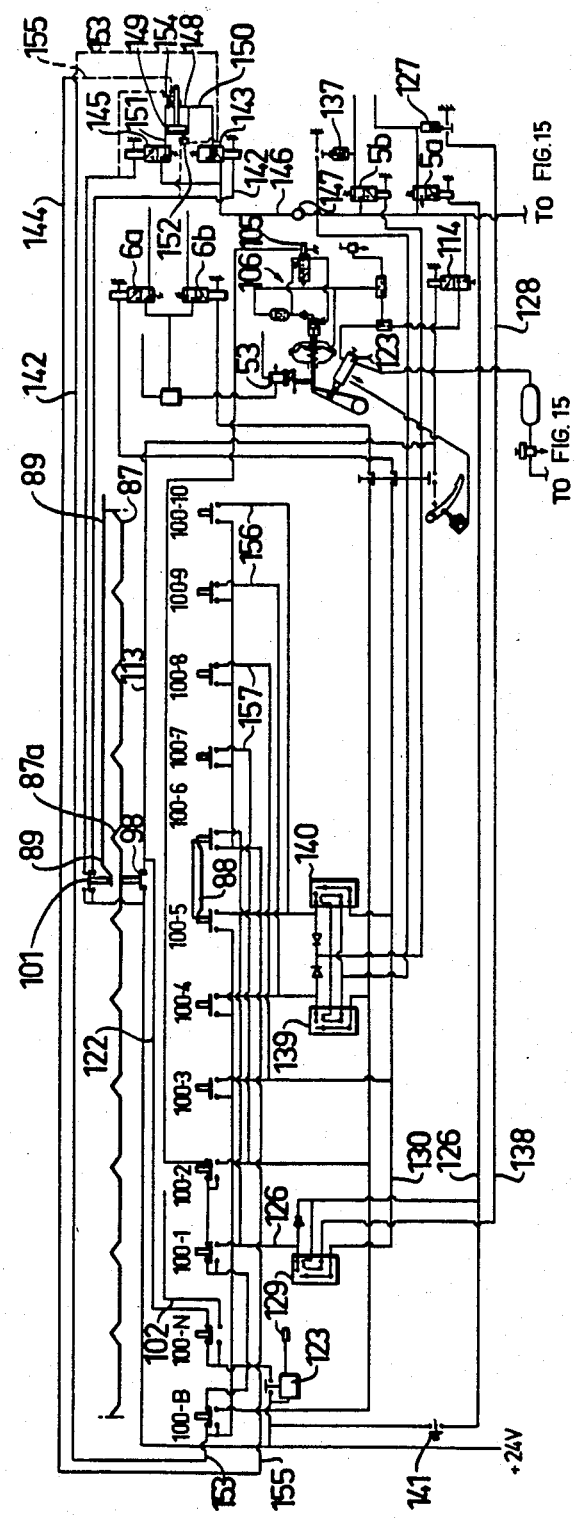
Figure 19:
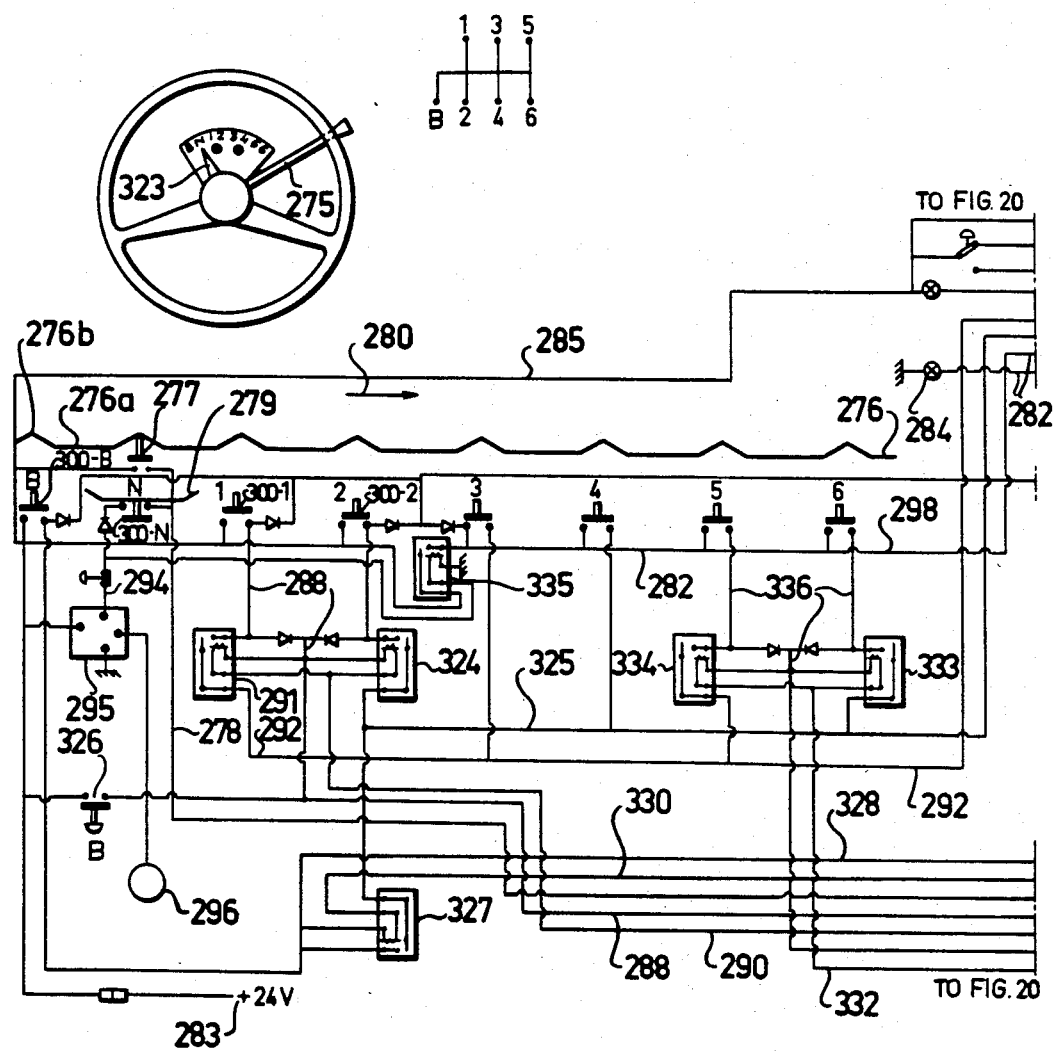
Figure 20:
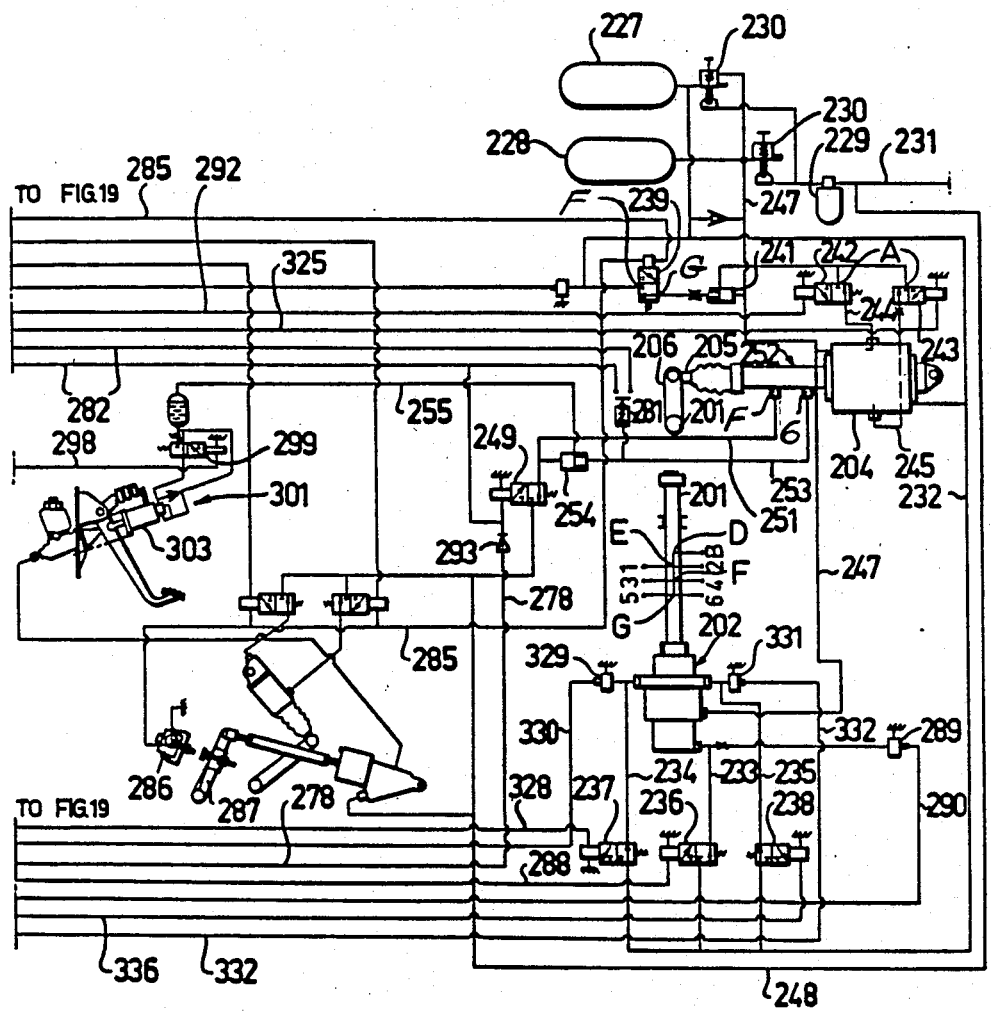
Figures 21, 22:
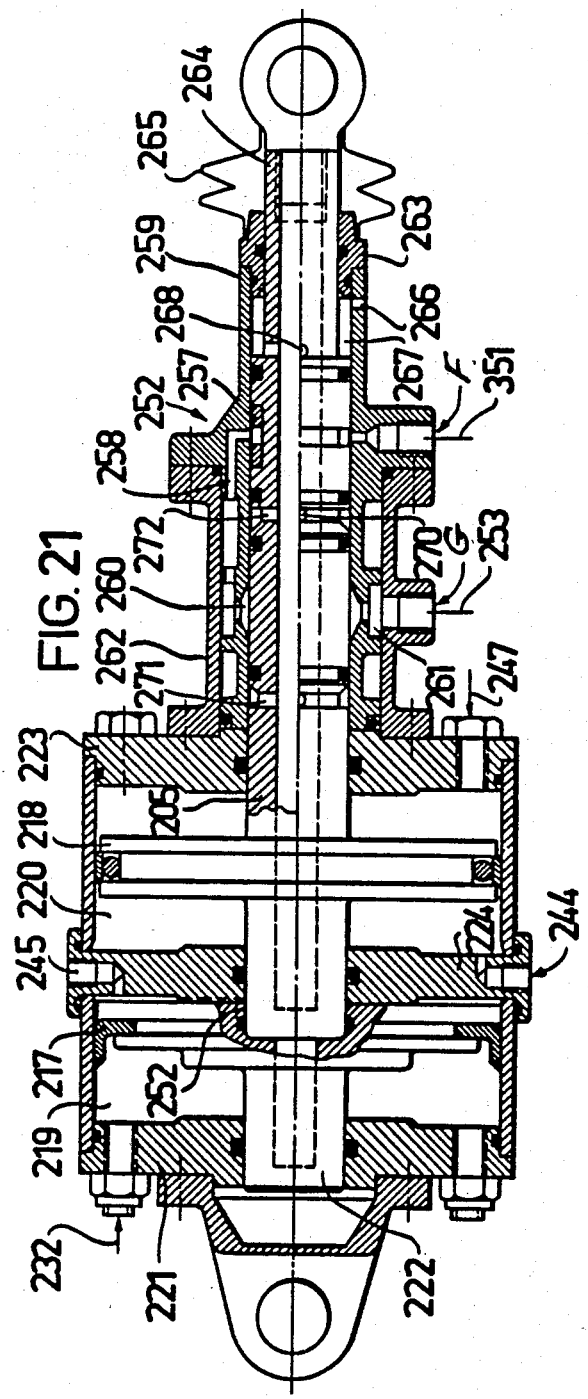
Figure 23:
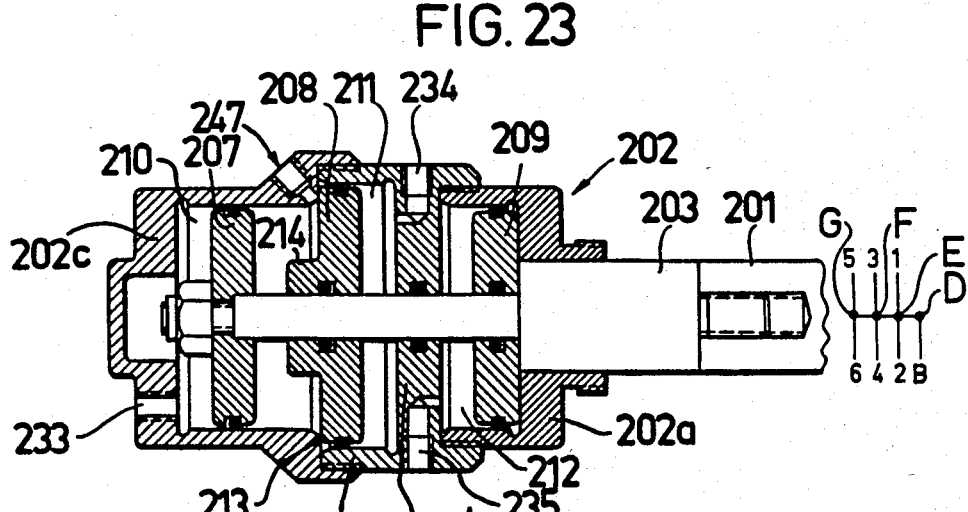
Figure 24:
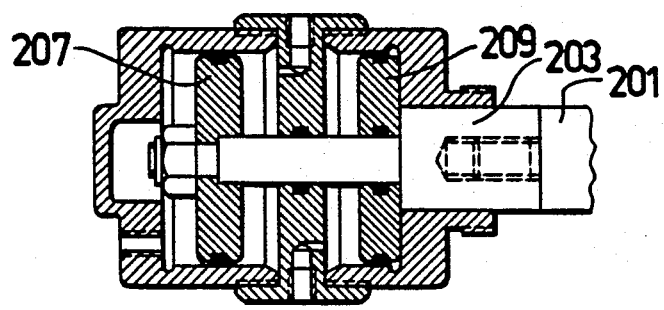
Figure 25:
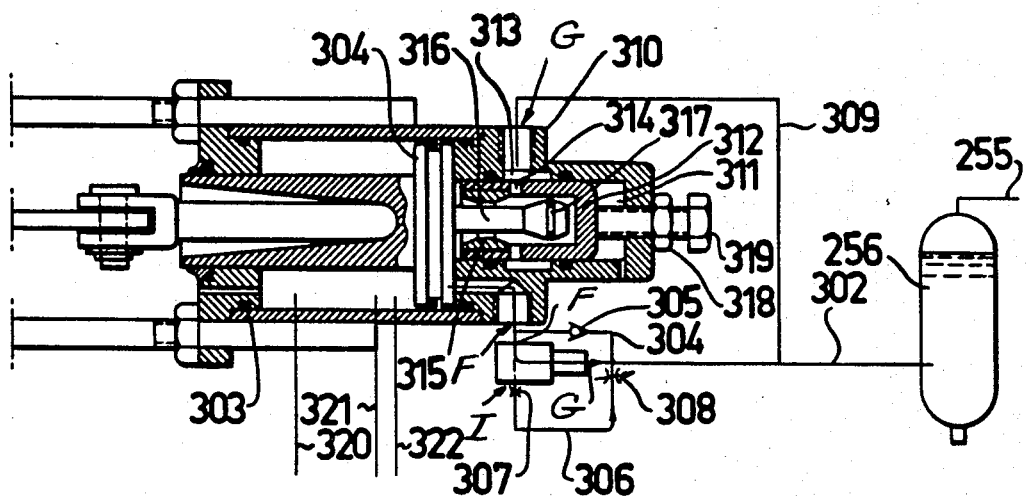

FIG. 7 is a schematic coupling diagram of the present gear shifting device for manual gear shifting or shifting with gear pre-selection of five or ten speed transmission, FIGS. 8a–i show different positions for valves, pistons etc. comprised in the gear shifting device, FIG. 9 is a schematic horizontal view of a second embodiment of the present gear shifting device mounted in a vehicle with manual gearbox and provided with a gear shifting device of its own for semiautomatic or fully automatic gear shifting, FIG. 10 is a section through a distributor comprised in a gear shifting device according to FIG. 9, FIG. 11 is a section along the line XI—XI in FIG. 10, FIG. 12 is a section along the line XII—XII in FIG. 10, FIG. 13 is a section along the line XIII—XIII in FIG. 10, FIG. 14 is a section along the line XIV—XIV in FIG. 10, FIG. 15 is a schematic view of a coupling diagram over the present gear shifting device according to the embodiment shown in FIGS. 9–14 for semiautomatic or fully automatic gear shifting of a five gear transmission, FIG. 16 is a schematic view of the coupling diagram according to FIG. 15 adapted to a ten gear transmission, FIG. 17 is a schematic view of a coupling diagram over the present gear shifting device adapted for passenger cars, FIG. 18 is a schematic lateral view of a vehicle combination comprising at least two driving motors and gearboxes for illustrating an additinal application of the gear shifting device according to the present invention, FIGS. 19 and 20 which latter is a direct continuation of FIG. 19, are together a coupling diagram over a modified embodiment of the gear shifting device according to the invention, adapted to semi-automatic shifting of a six or twelve gear manual gearbox, FIG. 21 is a section through a shift point cylinder comprised in the gear shifting device according to FIGS. 19 and 20, with a clutch lock valve in neutral position, FIG. 22 shows the clutch lock valve in shift point position, FIG. 23 is a section through a side position cylinder comprised in the embodiment of the present gear shifting device shown in FIGS. 19 and 20, FIG. 24 is a section through a side position-cylinder intended to be used at gearboxes with three side positions, and FIG. 25 is a schematic view of a section through a coupling cylinder with a means for traction position adjustment and automatic engagement and disengagement.

In the drawings, the reference numeral 1 generally designates a gearbox of known type mounted in a vehicle, on which gearbox a shifting cylinder 2 according to the invention with clutch lock for the shifting movements is screwed, and the ordinary gear shift lever 3 of which, according to the embodiment of the present invention shown in FIGS. 1–8 for manual shifting or shifting with preselection of the gears, is extended by a universally jointed extension rod 4 and by this rod is coupled to the shifting cylinder 2 via a side position valve 5 and a shift point valve 6. When the gear shift lever 3 at gear shifting is moved in lateral direction to the intended shift point, i.e. to any one of the points C,D or E on the neutral position line A, the extension rod 4 is turned, whereby its joint arm 8 is displaced linear and actuates the side position valve 5. When the gear shift lever 3 is moved into intended shift point, its extension rod 4 is displaced linear and actuates the shift point valve 6, the function of which and also that of the side position valve will become apparent from the description below.

The shifting cylinder 2, which comprises both a side position cylinder 2a and a shift point cylinder 2b, is coupled together with the shifter arm (not shown) of the gearbox through a shifter 9, which is attached on an axle 11 mounted rotatably and movably in the cylinder housing 10, and which by a lug 12 engages with a square hole 13 in a piston rod 14. The lug 12 and therewith the shifter 9 are movable in relation to said hole 13 in the longitudinal direction between two extreme positions.

The piston rod 14 is provided with two pistons 15,16, which are located on both sides of the shifter 9 and each in a cylindric space 17 and, respectively, 18, as appears from FIG. 2. Of said pistons, the piston 16 is mounted movably on the piston rod 14 so as to be able to move relative to said rod and the piston 15. In the position shown in FIG. 2, i.e. neutral position, the piston 16 abuts one cylinder end wall and also is held pressed against it by a constant upper operating pressure, which at this embodiment is assumed to be 6.8 kp/cm$^2$, while the piston 15 is centered in its cylindric space 17 and on the outside is under the effect of a constant lower operating pressure, which is half the said upper operating pressure, i.e. 3.4 kp/cm$^2$, the difference between these two operating pressures being the working pressure. As long as said operating pressures prevail, the shifter 9, thus, is held in neutral position.

The piston rod 14 is mounted and sealed on the outer surface of each piston 15,16 in end wall pieces 19 secured by screws, and the projecting ends of the piston rod are encased. In order to prevent the piston rod 14 from rotating, a guide pin 20 is located over the square hole 13.

Figure 4:
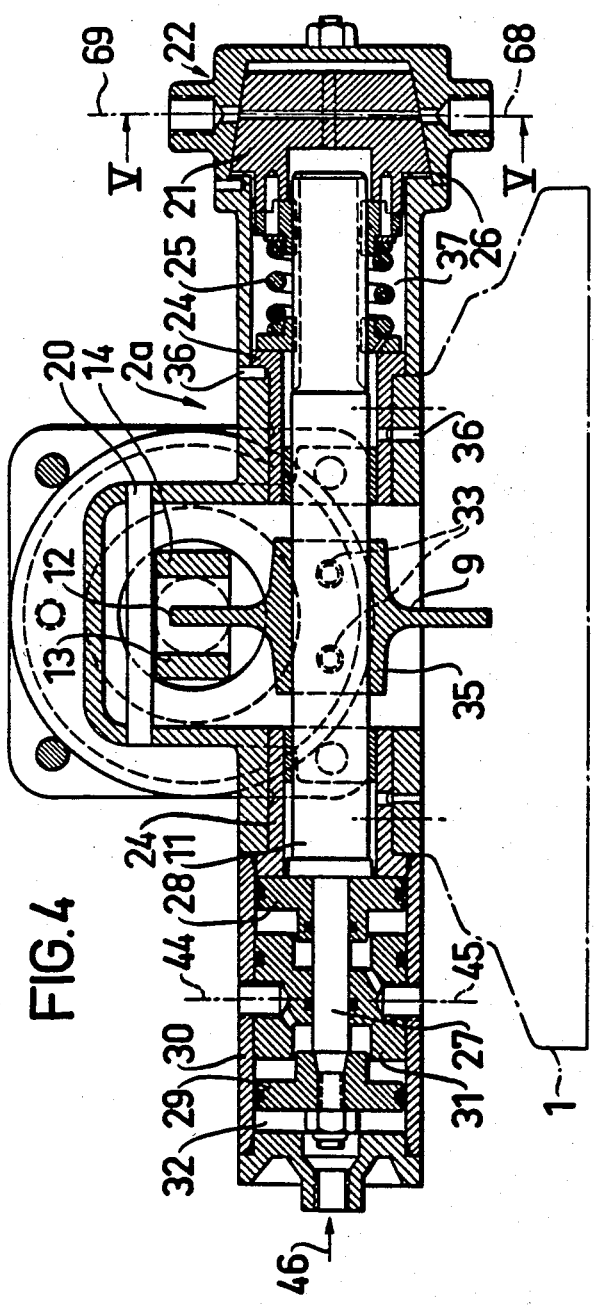
FIG. 4 is a section along the line IV—IV in FIG. 2.
Figure 6:
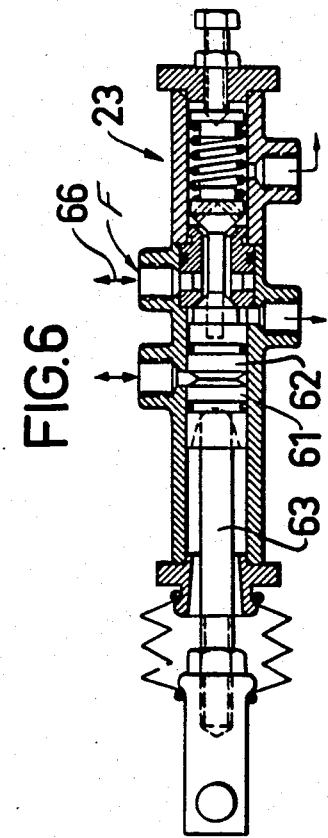
FIG. 6 is a section through a coupling cylinder.
Figure 5:
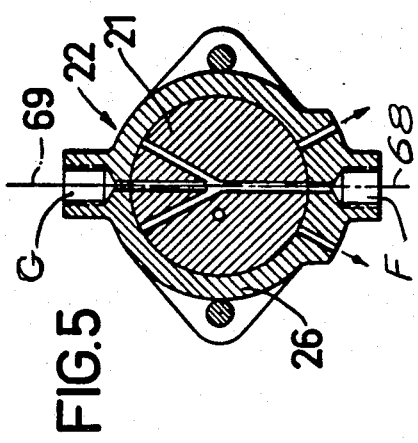
FIG. 5 is a section along the line V—V in FIG. 4.

The axle 11 carrying the shifter 9 is connected at one end by splines to a valve cone 21 of a three-position clutch lock valve 22, which in the position shown in FIGS. 4 and 5 is in indirect connection to a coupling cylinder 23 (FIGS. 6 and 7), and which in its two other positions evacuates the connection to or from the coupling cylinder 23, i.e. connects it to the atmosphere. Between a bearing bushing 24 for the axle 11 and the valve cone 21 a spring 25 is clamped, which holds the cone 21 pressed against its seat in the housing of the clutch lock valve and permits the axle 11 to move in axial direction without affecting the valve cone 21. Said clutch lock valve housing is designated by 26.

On the other side of the shifter 9, the axle 11 also is supported in a bearing bushing 24 and comprises a portion 27 acting as a piston rod, which portion is provided with two pistons 28,29, which are located each on one side of an intermediate piece 31, which is connected to a cylinder casing 20, and in which the piston rod or axle portion 27 is movably mounted. One 28 of said two pistons is mounted movably on its piston rod 27, while the other piston 29 is rigidly connected to the piston rod 27.

In neutral position the two pistons 28 and 29 assume the position shown in FIG. 4, the piston 28 abutting the bushing 24 and a stop member on the axle portion 27, and the piston 29 centered in its cylindric space 32. In this position the piston 28 is actuated by the upper operating pressure, while the piston 29 is actuated on its end facing to the piston 23 by the lower operating pressure and on its other end by a 0-pressure. With other words, the shifter 9 is held in neutral position and, thus, in the shift point position D (see FIG. 1) by the working pressure.

The shifter 9 is attached on the axle 11 by means of locking screws 33 shaped conically at the end, which screws with their conic ends enter conic depressions 34 in the axle 11. In order to render possible a certain adjustment of the shifter 9 in lateral direction on the axle 11, the distance between the conic depressions 34 in the axle 11 is slightly greater than the threaded holes for the screws 33 in the hub portion 35 of the shifter. In FIG. 4 the numeral 36 designates evacuation holes for venting the space 37, which communicates with the lock valve, and in which the spring 25 is located.

The said higher and lower operating pressures are maintained, as shown for example in FIG. 7, at a constant intended level each by a pressure tank 38 and, respectively, 39, which via filters 40, adjustable pressure reduction valves 41 and check valves 42 are connected to a common compressed air producer (not shown) of the vehicle. The compressed air tank 38 is connected through a conduit 43 to the cylinder space 18 for the piston 16, on which the higher operating pressure acts in the neutral position, and the pressure tank 39 is connected through a conduit 44 to the cylinder space 17 for the piston 15 and to the space between the intermediate piece 31 and the piston 29, on which as on piston 15 the lower operating pressure acts in the neutral position.

To the high-pressure conduit 43 also the high-pressure end of the piston 28 is connected via a conduit 45, which end is exposed to the upper operating pressure at least in the neutral position. In a similar way, the high-pressure end of the piston 29 is connected to the high-pressure conduit 43 via a conduit 46, in which the side position valve 5 is loacted and in the neutral position evacuates the high-pressure end of the piston 29, as shown in FIG. 7.

The side position valve 5 is connected via a connection 47 to a pilot-controlled control valve 48 located in the conduit 45, which valve is open in the neutral position so as to expose the piston 28 to the upper or lower operating pressure.

At gear shifting the side position valve 5 is actuated by the gear shift lever 3. When the lever is moved to the left to shift point position C for engaging the reverse gear, first gear or sixth gear, the side position valve 5 is actuated in such a manner, that it still evacuates the high-pressure end of the piston 29, but connects the conduit 47 to the high-pressure conduit 43, whereby the control valve 48 is closed and evacuates the pressure at the high-pressure end of the piston 28, which pressure thereby becomes 0. Since the pressure on the high-pressure end of the piston 28 is 0, the lower operating pressure acting on the low-pressure end of the piston 28 can move the piston 29. Thereby, thus, the shifter 9 is moved to the left in FIG. 4 to the first side position for gear engagement, at the embodiment shown for engaging the reverse gear, first gear or sixth gear (FIG. 8a).

When the gear shift lever 3 is moved in the opposite direction to the shift point position E for engaging the fourth, fifth, ninth or tenth gear, the side position valve 5 is actuated in such a manner, that it opens the conduit 46 to the high-pressure end of the piston 29 and evacuates the conduit 47. As a consequence, the control valve 48 opens the conduit 45. Thereby, the higher operating pressure will act through the conduit 46 on the high-pressure end of the piston 29, and the piston 29 with the piston rod 27, thus, is moved to the right in FIG. 4 to its other side position for gear engagement, at the embodiment shown for engaging the fourth, fifth, ninth or tenth gear (FIG. 8b). At the engagement of other gears, the gear shifter 9 remains unaffected in the central position shown in FIG. 4, i.e. the neutral position.

Figure 1:
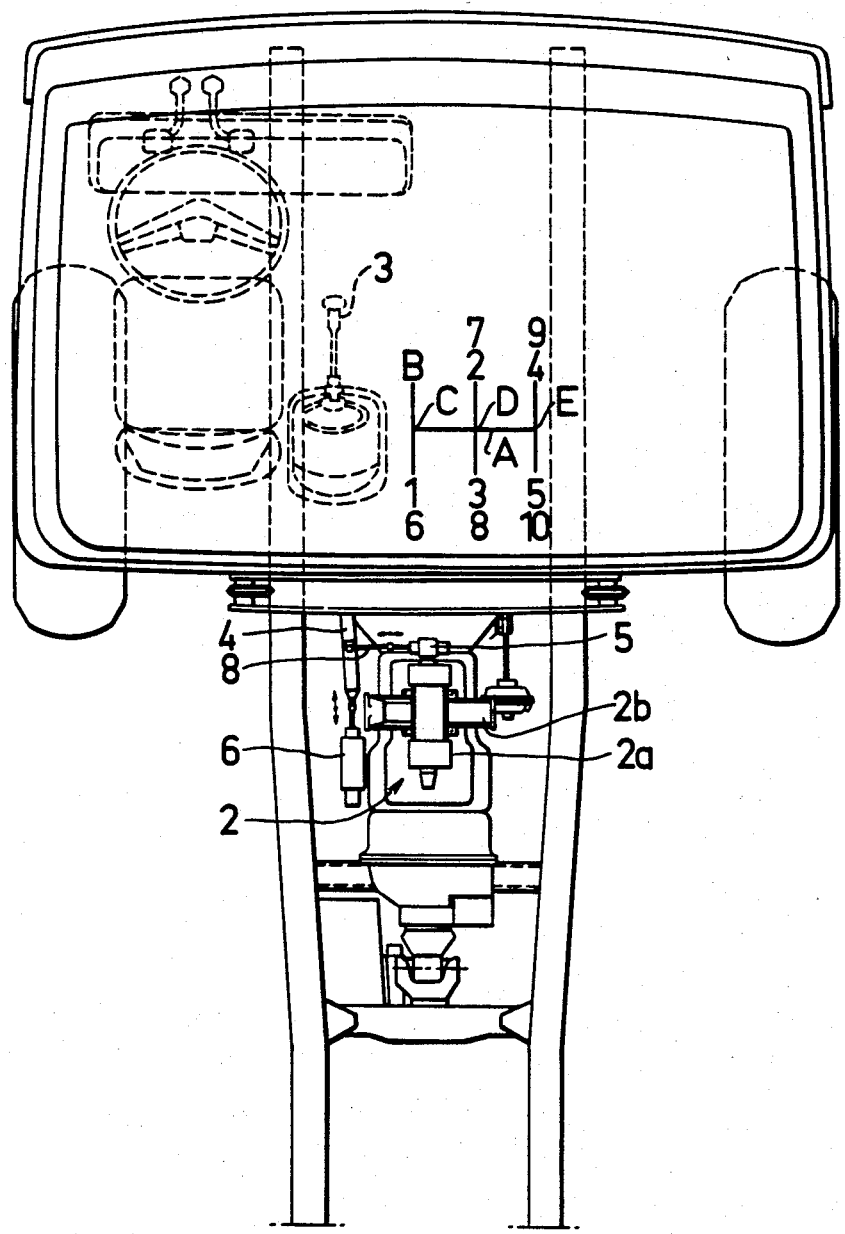

At the engagement of a gear, the gear shift lever 3 is moved either forward or rearward in FIG. 1 from its shift point position, and thereby the shift point valve 6 is actuated in one direction or the other. Said valve 6 is connected with its input A, through a conduit 50 including a shift valve 51 communicating with the low-pressure conduit 44, to a coupling valve 53, which is controlled by the engagement and disengagement of the clutch of the vehicle and communicates through a conduit 52 with the high-pressure conduit 43. The shift position valve 6 further is connected with its inputs D and E to the low-pressure conduit 44 through a conduit 54, which is provided with a pilot-controlled valve 55, which for its operation is coupled into the conduit 50 between the shift valve 51 and coupling valve 53 through a conduit 56. In the position shown, i.e. the neutral position, the valve 55 is open, and thereby the lower operating pressure prevails in the inputs D and E of the shift point valve as well as in a pair of conduits 57 and, respectively, 58 connected to the outputs B and C of the valve, of which conduits the latter one is connected to one end of the piston 15, the other end of which permanently communicates with the low-pressure conduit 44, while the conduit 57 is connected to a pilot-controlled control valve 59 located in the high-pressure conduit 43 in order to actuate said valve by a control pressure, which in the neutral position corresponds to the lower operating pressure, and which is counteracted by a corresponding control pressure on the other side of the valve 59, which latter control pressure always is corresponded by the lower operating pressure and is supplied via a conduit 60 connected to the low-pressure conduit 44.

At declutching for gear shift, i.e. when the clutch pedal is actuated, the oil pressure in the coupling cylinder 23 is increased in known manner, and thereby its two pistons 61 and 62 (see FIG. 6) are moved apart. One piston 61 pivots through its piston rod 63 a rocking lever 64 counterclockwise in FIG. 7, which lever thereby so actuates the coupling valve 53 that it connects the shift point valve 6 to the high-pressure conduit 43. Thereafter the higher operating pressure will prevail at the input A of the shift point valve.

The coupling cylinder 23 also is under the effect of compressed air with a pressure, which may be equal to the lower operating pressure or be any optional pressure, but which must not exceed the upper operating pressure. When by depressing the clutch pedal the oil pressure increases, also the piston 62 in the coupling cylinder 23 is displaced, and thereby the pressure connection through the coupling cylinder 23 to its output A is opened, which via a shift valve 65 is connected through a conduit 66 to a pressure bell 67, which assists in swinging the rocker lever 64 when being exposed to the air pressure in the conduit 66.

In the conduit 66, between the coupling cylinder 23 and the shift valve 65, a conduit 68 is connected which is coupled to the input A of the clutch lock valve 22. From the output B of this valve a conduit 69 extends to the shift valve 65, and before said shift valve in the conduit 69 a quick-releasing valve 70 is mounted for, if required, rapidly evacuating the pressure in the conduit 69. In the conduits both to and from the clutch lock valve 22 the pressure in the neutral position is zero.

The said air pressure effected in the conduit 66 by depressing the clutch pedal, thus, causes the shift valve 65 to close the conduit 69 to the output B of the clutch lock valve and to open the connection to the pressure bell 67, which thereby assists in the opening of the connection between the high-pressure conduit 43 and the shift point valve 6 by the coupling valve 53, whereby the shift valve 51 is caused to close the low-pressure conduit 44, and the pilot-controlled control valve 55 is caused by the higher pressure in the conduit 50 to assume the position shown in FIG. 8c, in which position the outputs D and E of the shift point valve are evacuated (pressure=0) through the conduit 54, and the low-pressure conduit 44 is closed. Thereby also the pressure in the conduits 57 and 58 is zero, but this does not affect the control valve 59 nor the pistons 15 and 16 of the shift point cylinder.

When now the gear shift lever 3 is moved, for example, to the shift point for the first gear, the shift point valve 6, after the pistons 28 and 29 of the side position cylinder have assumed the position shown in FIG. 8a, is caused to assume the position shown in FIG. 8c, in which position the input A of said valve is connected to its output C, whereby the higher operating pressure acts upon the piston 15 of the shift point cylinder which is connected to the piston rod 14, which piston 15 by its piston rod 14, which in this position is movable relative to the piston 16, is moved to its right-hand end position, as shown in FIG. 8f. Hereby the axle 11 is turned by the shifter 9 coupled together with the piston rod 14, and the shifter simultaneously therewith actuates the shifter arm of the gearbox to engage the gear intended. Due to the turning of the axle 11, also the clutch lock valve 22 is adjusted to the position shown in FIG. 8h, in which position the pressure in the conduit 69 is evacuated, while the pressure in the conduit 68 remains unchanged.

When now the clutch pedal is released, it re-assumes in known manner its original position, and thereby the coupling valve 53 is actuated to assume the starting position shown in FIG. 7, whereby the connection to the high-pressure conduit 43 is interrupted, and the pressure in the conduit 50 is zero. This implies that the shift valve 51 connects the low-pressure conduit 44 to the conduits 50 and 58, whereby the high-pressure side of the piston 15 still is under a pressure, which at least corresponds to the lower operating pressure, and the piston 15, thus, is not actuated. Simultaneously, with the pressure in the conduit 50 becoming zero, also the pilot-controlled control valve 55 is actuated to assume the position shown in FIG. 7 and thereby connects the low-pressure conduit 44 to the conduits 54 and 57, whereby the control valve 59 again is exposed to the lower operating pressure which, however, is not capable to change the position of the valve, due to the control pressure of equal size in the conduit 60 on the other side of the valve. Thereby a gear shift procedure is completed, at which, for example, the first gear is engaged, and the gear shifting device is ready for the next gear shifting procedure.

When the vehicle has increased its speed and a higher gear is to be engaged, this can be effected manually in the way described above by depressing the clutch pedal and moving the gear shift lever 3 to the desired shift point, whereby the clutch pedal is released, or by preselecting the desired gear, i.e. the gear shift lever first is moved to the shift point intended and then engaging of the preselected gear is effected by depressing the clutch pedal. In other words, the gear shifting device according to the present invention can be used for manual gear shifting or for gear shifting with preselection of all gears.

It is assumed that the second gear is to be engaged with preselection. Therefore, at first the gear shift lever 3 is moved from the shift point for the first gear to the side position C, whereby the shift point valve 6 returns to the position shown in FIG. 7, in which position the input A is blocked, while the two conduits 57 and 58 are connected to the low-pressure conduit 44. The gear shift lever then is moved to the shift point position D, whereby the side position valve 5 is returned to the neutral position shown in FIG. 7, which implies that both the conduit 46 and the conduit 47 are evacuated, whereby the control pressure on the control valve 48 ceases, and this valve shifts to the position shown in FIG. 7 and opens the high-pressure conduit 45 all the way to the high-pressure side of the piston 28, which thereby is exposed to the higher operating pressure. The piston 28, thus, is moved together with the axle 11 and the piston 29 to the neutral position shown in FIG. 7, without thereby actuating the clutch lock valve 22, which, thus, stil remains in the position shown in FIG. 8h. Thereafter the gear shift lever 3 is moved into the shift point for the second gear, whereby the shift point valve 6 is caused to assume the position shown in FIG. 8d, in which position the input A of the valve is connected to its output B, and the input E is connected to the output C. Thus, no change of the pressure conditions in the conduits 57 and 58 takes place. Thereby the pistons 15,16 of the shift point cylinder are not affected, nor is the control valve 59 affected, but the gear previously engaged remains engaged.

When now the preselected gear is to be engaged, the driver only has to depress the clutch pedal, whereby the coupling valve 53 in the way described above opens the connection from the high-pressure conduit 43 to the input A of the shift point valve 6. Thereby the pilot-controlled control valve 55 is adjusted to the position shown in FIG. 8c and effects evacuation of the conduits 54 and 58. This implies that the pressure on the high-pressure side of the piston 15 is zero, and as the control pressure in the conduit 57 now is higher than the control pressure in the conduit 60 on the other side of the control valve 59 in the high-pressure conduit 43, also this valve is adjusted (FIG. 8g) so that the cylinder space 18 is evacuated, and the pressure becomes zero. Thereby the pressure on the high-pressure sides of the pistons 15 and 16 becomes zero, and the lower operating pressure, which via the low-pressure conduit 44 constantly acts upon the low-pressure side of the piston 15, causes the piston 15 to move from the end position shown in FIG. 8f to its other end position shown in FIG. 8g via the central or neutral position, from which position the piston 15 through its piston rod 14 also moves the piston 16 to its other end position shown in FIG. 8g. During this movement of the pistons 15,16, the axle 11 is turned by the shifter 9, and thereby the valve cone 21 of the clutch lock valve is moved to its other end position shown in FIG. 8i and thereby passes the position shown in FIG. 7, in which the conduits 68 and 68 to and from the lock valve 22 are connected to each other and block the clutch, so that this cannot return unless gear shift has taken place. The gear shift is completed when the pistons 15 and 16 of the shift point cylinder have assumed the position shown in FIG. 8g. Thereby also the lock valve 22 has assumed the position shown in FIG. 8i and evacuates the conduit 69. First thereafter the clutch can return from the neutral position to the traction position. Thereby the coupling valve 53 again is actuated and interrupts the connection between the high-pressure conduit 43 and the input A of the shift point valve and evacuates the pressure in the conduit 50, whereby the shift valve 51 and the pilot-controlled control valve 55 are adjusted in the way described above, so that the lower operating pressure will prevail both in the conduit 58 and in the conduit 57. Thereby neither the control 59 nor the pistons 15,16 are actuated which, thus, remain in the end position shown in FIG. 8g.

As an example may be assumed that the next gear shift is to take place directly from the second to the fifth gear by preselection. For this purpose the gear shift lever 3 is moved, without first actuating the clutch pedal, from the second gear shift point to the side position E (FIG. 1), whereby the shift point valve 6 is returned to the position shown in FIG. 7, without thereby effecting any actuation of the control valve 59 nor of the pistons 15 and 16 of the shift point cylinder, while the side position valve 5 is so adjusted—its slide 5a is moved to the right in FIG. 7— that its input A is connected to the conduit 46 and that it evacuates the conduit 47. This implies that also the piston 29 of the side position cylinder on its high-pressure side is exposed to the higher operating pressure and thereby is moved to its end position where it abuts the intermediate piece 31 and thereby moves the piston rod 27 relative to the piston 28, which hereby is in its end position abutting the bushing 24. Thereby also the axle 11 and the shifter 9 connected thereto are moved to the right in FIG. 4 to the position shown in FIG. 8b, which at the gear shift diagram according to the embodiment shown is the side position for the fourth, fifth, ninth and tenth gear.

When then the gear shift lever 3 is moved into the shift point for the fifth gear, the shift point valve 6 is actuated and adjusted to the position shown in FIG. 8e, which position is the same for the shift points of the first, third, fifth, sixth, eigth and tenth gear. At this position of the shift point valve its input A is connected to the conduit 58, while the conduit 57 is connected to the output D and thereby to the conduit 54. As it still is the lower operating pressure, which prevails both at the input A of the shift point valve and in the conduit 54, no pressure difference arises by adjusting the shift point valve from the position shown in FIG. 7 to the position shown in FIG. 8e, and thus no pressure difference can affect the pilot-controlled control valve 59 nor the piston 15 of the shift point cylinder. The said pressure difference is obtained first when the clutch pedal is depressed, When now said pedal is depressed for shifting to the preselected gear, i.e. the fifth gear, the coupling valve 53 is actuated in the aforedescribed way so by the rocker lever 64 connected to the pressure bell 67 and coupling cylinder 23, that said valve connects the conduit 50 to the high-pressure conduit 43, whereby the piston 15 of the shift point cylinder on its high-pressure side is exposed to the higher operating pressure via the conduit 58, and simultaneously the control valve 55 (FIG. 8c) is so adjusted by the higher pressure, that it evacuates the conduit 54 and thereby the conduit 57 to the pilot-controlled control valve 59. The control pressure on the side of the control valve 59 connected to the conduit 57, thus, is zero, and thereby the control pressure acting on the other side of the valve is capable to adjust the valve 59 to the position shown in FIG. 7, in which position the piston 16 of the shift point valve on its high-pressure side is exposed to the higher pressure, whereby the piston 16 and the piston 15 are moved from the position shown in FIG. 8g to the position shown in FIG. 8f and simultaneously turn the shifter 9 so as to engage the fifth gear in the gearbox and move the valve cone 21 of the clutch lock valve to the position shown in FIG. 8h. First when said valve cone 21 has assumed said position, in which it evacuates the conduit 69, the clutch pedal can return to traction position for engaging the gear, and thereby also the coupling valve 53 is caused to interrupt the connection between the high-pressure line 43 and the input A of the shift point cylinder and to evacuate the pressure in the conduit 50, whereby the shift valve 51 and the pilot-controlled control valve 55 are adjusted in the aforedescribed way so that the lower operating pressure will prevail in the conduit 58 as well as in the conduit 57. Hereby no pressure difference arises which can actuate the control valve 59 or the pistons 15 and 16 of the shift point cylinder, which thus remain in the position shown in FIG. 8f until the neaxt gear shift is to be carried out.

The manual gearbox used in the example is, as indicated by dash-dotted lines, equipped in known manner with a high-gear and low-gear mechanism generally designated by 72, which through the conduits 73 and 74 is connected to the conduit 50 and, respectively, 66, to said latter via a quick-release valve 75 and a shift valve 76. As the high-gear and low-gear mechanism is well-known to the expert both with respect to its design and function, and as it does not have influence on the gear shifting procedure described, it need not be elucidated for illustrating the present invention.

In FIG. 9 an embodiment of the present invention is shown mounted in a vehicle with a manual five-gear gearbox. The embodiment is intended for semi-automatic or fully automatic gear shift and with electric control of the gear shift cylinder 2 connected in the aforedescribed way to the gearbox 1.

At this embodiment the gear shift lever 3 by way of example is shown rigidly connected to a gear wheel 80 mounted rotatably on the steering column, with which gear wheel a pinion 81 co-operates which is connected to an axle 82 rotary mounted at the steering column, which axle through a hinged joint or flexible axle 83 is connected to an axle 85 in a distributor 84. Upon turning the gear shift lever 3, thus, the axle 85 of the distributor is turned in a corresponding degree, and on this axle, as shown in FIGS. 10–14, a number of cams 86–89 are located which are fixed relative to each other by pins 90 and can be exchanged. Said cams are in turn called locking position disc 86, which at its periphery is provided with twelve depressions 86a, coupling cam disc 87, which is provided at its periphery with twelve depressions 87a, shift point disc 88 and high-low gear cam 89.

As shown in FIG. 10, the azle 85 is supported by a bearing 91 in the back 92 of the distributor, and on the axle 85 the cams 86–89 are retained in exchangeable manner by means of a washer 93 and screw 94. To said back also a sleeve 95 enclosing the cams is connected, which sleeve directly in front of the locking position disc 86 carries two spring-loaded locking pins 96 and 97, which are arranged for co-operation with the depressions 86a of the locking position disc so as to lock the disc 86 and thereby the axle 85 in disengagement position effected by the locking pin 96, and, respectively, in shift position effected by the locking pin 97. Directly in front of the coupling cam disc 87 in the sleeve 95 a coupling breaker 98 is located which by a contact pin 98a acting as cam follower co-operates with the coupling cam disc 87 to be disconnected, i.e. break a current circuit when the contact pin 98a enters a depression 87a, and be connected, i.e. close the circuit when the pin 87a is on the cam portions 87b between the depressions 87a. Directly in front of the shift position cam 88 in the sleeve 95 a number of shift pointion breakers 100 (100-B, 100-1 a.s.o.) corresponding in number to the gears and a neutral position breaker 100-N are located to be engaged and disengaged in response to the position of the shift point cam. Furthermore, directly in front of the high/low-gear cam 89 in the sleeve 95 a high/low-gear breaker 101 is located to be engaged and disengaged in response to the position of the high/low-gear cam.

For semi-automatic gear shift, however, in FIG. 15 only an electric coupling diagram for a five-gear manual gearbox and adapted thereto a pneumatic coupling diagram over the gear shift device according to the present invention are shown, which latter however is slightly different from that shown in FIG. 7. In FIG. 15 the details are shown in neutral position, in which position the locking pin 96 is in a depression 86a, the contact pin 98a of the coupling breaker is in a depression 87a (dashed position in FIG. 12), and the shift point cam 88 (dashed position in FIG. 13) is in the position directly in front of the neutral position breaker 100-N, the contact pin of which is held depressed, and the high/low-gear cam 89 is in the position indicated in FIG. 14 by dashed lines, which latter cam is not necessary at a five-gear box without highand low gear.

In the neutral position the neutral position breaker 100-N closes a circuit 102 to an electric valve 103, which in this position evacuates the conduits 68 and 69 before and after the clutch lock valve 22, and the reverse position breaker 100-B and the shift point breaker of the first gear 100-1 close a circuit 104 to an electric valve 105 in a traction position damper 106 with oil tank 107 connected to an auxiliary cylinder 108 to the coupling pressure bell 67 via a conduit 109 with check valve 110. From said auxiliary cylinder a conduit 111 extends through the electric valve 105 back to the oil tank 107.

For engaging the first gear, the gear shift-lever 3 is turned downward, whereby the axle 85 of the distributor is turned in the direction indicated by the arrow 112 in FIG. 11. Thereby the contact pin 98a of the coupling breaker is depressed by the coupling cam disc 87 and closes a circuit 113 to an electric valve 114, which thereby is caused to connect the high-pressure conduit 43 to the conduit 66. Thereby the shift valve 65 is caused to block the connection to the conduit 69, while the pressure bell 67 and the oil in the tank 107 are exposed to the higher pressure to cause the clutch to declutch and the pressure bell 67 to swing the rocker lever 64, which thereby opens the coupling valve 53 whereby this valve connects the high-pressure conduit 43 to the conduit 50. The higher pressure now prevailing in the conduit 50 causes a pressure transducer 115 unactuated by the lower operating pressure to close a circuit 116 to a control lamp 117 preferably located in the driver's cab, which lamp indicates declutching of the clutch. The higher pressure in the conduit 50 further causes the shift valve 51 to block the low-pressure conduit 44 and to open the connection to the shift point valve, which here consists of two electric valves 6a and 6b, the input A of which is connected to the conduit 50 and normally is closed. The output B of the valve 6a which in FIG. 15 is evacuated is connected through the conduit 58 to the high-pressure side of the piston 15 of the shift point cylinder, while the output B of the other valve evacuated in FIG. 15 is connected through the conduit 57 to the low-pressure side of the piston 16 of the shift point cylinder, the high-pressure side of which through the conduit 60 is connected directly to the high-pressure conduit 43 and, thus, is exposed constantly to the higher operating pressure. In the position shown in FIG. 15, thus, the pressure in the conduits 57 and 58 is zero.

It can be noted that the control valve 59 used in FIG. 7, thus, is excluded in the example shown in FIG. 15.

When the shift point cam 88 during its rotary movement caused by the gear shift lever 3 leaves the neutral position breaker 100-N, which is marked in that the locking pin 97 snaps into a depression 86a in the cam disc 86, the circuit 102 is interrupted and thereby the valve 103 is so adjusted that it connects the conduit 43 to the conduit 68. Thereby the higher operating pressure also prevails in the conduit 69, whereby a pressure transducer 119 unactuated by the higher operating pressure is caused to close a circuit 120 to a control lamp 121 preferably located in the driver's cab for shifting. The higher operating pressure in the conduit 69 also protects the clutch against too early declutching.

At the same time as the breaker 100-N breaks the circuit 102, it closes a circuit 122 connected to the coupling circuit 110, which circuit 122 like the circuit 102 before the breaker 100-N comprises a contact 123, which is controlled by a pulse counter 124 in response to the motor revolutions so as to declutch the vehicle at idle speed of the motor.

The next step in the gear shifting procedure is that the shifting cam 88 actuates the shift point breaker 100-1 of the first gear, which breaker thereby breaks the circuit 104, whereby the electric valve 105 of the traction position damper assumes its other position, which implies that the oil from the auxiliary cylinder 108 must pass two throttle valves 125 for being returned to the oil tank 107. Thereby a soft engagement of the traction position is obtained when such is to take place. The shift point breaker 100-1 at the same time as it breaks the circuit 104 also is caused to close a circuit 126 to a two-position electric valve 5a, which is one of two side position valves 5a,5b for the pistons 28,29 of the side position cylinder. The side position valve 5a in its normally open position shown in FIG. 15 connects the high-pressure conduit 43 to the conduit 45 to the high-pressure side of the piston, while the other side position valve 5b in its normally closed position shown in FIG. 15 evacuates the high-pressure side of the piston through the conduit 46.

When, thus, the circuit 126 is closed, the side position valve 5a is caused to assume its second position, in which it evacuates the conduit 45, so that the pressure on the high-pressure side of the piston is zero, and the piston 28 in the aforedescribed way adjusts the shifter 9 to the side position for the first gear (FIG. 8). When the pressure in the conduit 45 has dropped below a predetermined value, for example 0.2 kg/cm$^2$, a pressure transducer 127 closes a circuit 128 to a relay 129, which thereby is engaged and in its turn closes a circuit 130 to the shift point valve 6a, whereby this valve is caused to assume its other position, in which its input A where the higher operating pressure prevails is connected to the conduit 58. The piston 15, thus, is exposed on its high-pressure side to the higher operating pressure and thereby is moved in the aforedescribed way to the position shown in FIG. 8f for engaging the first gear in the bearbox, and simultaneously therewith the valve cone 21 of the clutch lock valve is turned to the position shown in FIG. 8h, in which position the conduit 69 is evacuated. When the pressure in the conduit 69 has dropped below a predetermined value, which shall be higher than the lower operating pressure, for example 5 kg/cm$^2$, the pressure transducer 119 breaks the circuit 120, and the control lamp 121 extinguishes, which indicates that the gear shifting procedure is completed and the gear intended is engaged.

When the gear shifting lever 3 enters the position for the first gear, the locking pin 96 snaps into a depression in the cam disc 86 and yields a distinct shift position. At the same time as this position is obtained, the contact pin 98a of the coupling breaker snaps into a depression 87a in the coupling cam disc 87 and thereby the circuit 113 is broken, whereby the electric valve 114 assumes the position shown in FIG. 15 for evacuating the pressure in the conduit 66 and peessure bell 67. First thereafter the clutch can return to traction position, which takes place in a soft way owing to the traction position damper 106. At this return, the coupling valve 53 is adjusted to its normal position, in which it evacuates the conduit 50. When the pressure in this conduit has dropped below a predetermined value, which shall be higher than the lower operating pressure, for example 5 kp/cm$^2$, the pressure transducer 115 breaks the circuit 116, whereby the control lamp 117 extinguishes and thereby indicates, that the clutch is engaged.

For rendering possible declutching without having to disengage a gear, a pressure contact 131 is provided in the driver's cab, which contact upon its depression closes a circuit 132 coming from all shift point breakers 100, except of course from the neutral position breaker 100-N. Said circuit 132 is connected to the coupling circuit 113 after the coupling breaker 98, and thereby the clutch is caused in the aforedescribed way to declutch. When then the pressure contact 132 is released, the circuit 132 again is broken, and the clutch can return to traction position.

At kicking up to the second gear, the gear shift lever 3 is turned through a further step in the same direction, and thereby the coupling breaker 98 is caused to close the circuit 113, whereby declutching takes place in the aforedescribed way, and the shift point cam 88 is caused to leave the shift point breaker 100-1, whereby this breaker breaks the circuit 126, which implies that the side position valve 5a assumes the possition shown in FIG. 15 and connects the conduits 43 and 45 with each other. The pressure transducer 127 breaks the circuit 128, and the pistons 28 and 29 of the side position cylinder are caused to return to the position shown in FIG. 15, which also is the side position for the second and the third gear. When the circuit 126 is broken, also the relay 129 disengages, and the circuit 130 is broken, whereby the shift point valve 6a returns to the position shown in FIG. 15, in which position the conduit 58 is evacuated, and the piston 15 returns from the position shown in FIG. 8f to the position shown in FIG. 15 and thereby adjusts the valve cone 21 of the clutch lock valve to the position shown in FIG. 15. Thereby the pressure in the conduit 69 is the same as the higher operating pressure, and the pressure transducer 119 is actuated in the aforedescribed way for coupling-in the control lamp 21.

When then the shift point breaker 100-2 for the second gear is actuated by the shift point cam 88, it closes a circuit 133 to the shift point valve 6b, which thereby is adjusted to its other position, in which its input A, at which now the higher pressure prevails, is connected to the conduit 57. Thereby the pistons 15 and 16 of the shift point cylinder are moved to the position shown in FIG. 8g, and through the shifter 9 the second gear is engaged in the gearbox, and the valve cone of the clutch lock valve is turned to the position shown in FIG. 8i, in which position the conduit 69 is evacuated. As soon as the coupling breaker 98 breaks the circuit 113, the clutch returns to traction position whereby traction position damping only occurs over a throttle valve 125.

At kicking up to the third gear, the breaker 100-3 is closed after declutching, and the circuit 130 is closed after the relay 129, because in this case the pistons 28 and 29 of the side position cylinder need not be actuated. The gear shifting then takes place in the aforedescribed way.

According to the present invention, it is also possible at the semi-automatic gear shifting device to jump over one or more gears without affecting the engaged gear. For this purpose, a foot-operated contact 135 or a hand-operated contact is provided in the driver's cab, which contact is coupled-in after all shift point breakers 100 in the circuits 130,133. For elucidating its function it is assumed that direkt kick-up from the second gear to the fourth gear is desired. At the same time as or after the gear shift lever 3 has been moved from the shift point of the second gear, whereby the coupling circuit 113 is closed and the circuit 133 is broken, so that the shift point valve 6b is adjusted to the position shown in FIG. 15 and evacuates the conduit 57 to move the pistons 15 and 16 of the shift point cylinder to the neutral position shown in FIG. 15, the contact 135 is actuated. However, as these circuits were broken previously, nothing happens. When then the shift point cam 88 passes over the shift point breaker 100-3 for the third gear, nothing happens, because the circuit 130 is broken already by the contact 135. Before the gear shift lever 3 is being moved into the shift point of the fourth gear, the contact 135 is released for coupling-in the two circuits 130 and 133. When then the shift point cam 88 actuates the shift point breaker 100-4, it closes a circuit 136 to the side position valve 5b, which is adjusted to its other position and thereby connects the high-pressure conduit 43 to the conduit 46, whereby the piston 29 moves the shifter 9 to the side position for the shifting point of the fourth or fifth gear. When the pressure in the conduit 46 rises above a predetermined value, for example 5 kp/cm², a pressure transducer 137 is caused to close a circuit 138 to a relay 139, whereby this is engaged and closes the circuit 133 to the shift point valve 6b, whereby the pistons 15 and 16 of the shift point cylinder are moved to the position shown in FIG. 8g for inserting the fourth gear into the gearbox and for adjusting the clutch lock valve 22 to the position shown in FIG. 8i, whereby the conduit 69 is evacuated. The coupling breaker 98 then effects in the way described the coupling-in of the traction position. For the fifth gear a relay 140 is provided, which upon its actuation closes the circuit 130 to the shift point valve 6a for moving the pistons 15 and 16 of the shift point cylinder to the position shown in FIG. 8f for engaging the fifth gear in the gearbox.

For engaging the reverse gear, which can be effected only from the neutral position, first a contact 141 preferably located in the driver's cab must be closed before the gear shift lever 3 can be moved to the reverse position. By closing the said contact, also the circuit 126 is closed, whereby the conduit 45 is evacuated, and the pistons 28 and 29 of the side position cylinder move the shifter 9 to the side position for the shift point of the reverse gear (FIG. 8a). Thereby the gear shift lever can be moved to the reverse gear point, whereby the neutral position breaker 100-N breaks the circuit 102 to the electric valve 103 and closes the circuit 122 to the coupling circuit 113 already closed by the coupling breaker 98 for declutching the clutch. In the reverse gear point the cam 88 actuates the reverse position breaker 100-B so that the circuit 104 over the shift point breaker 100-1 to the electric valve 105 of the traction position damper is broken and the circuit 133 to the shift point valve 6b is closed, whereby the input A of this valve is connected to the conduit and thereby the pistons 15 and 16 of the shift point cylinder are moved to the position shown in FIG. 8g for engaging the reverse gear in the gearbox. Upon return of the clutch to the traction position it is damped by the two throttle valves 125 in the traction position damper 106. In FIG. 15 also a known high/low gear cylinder is shown for illustrating, that it does not involve any difficulties or problems, but rather is very simple to use the present gear shifting device of semi-automatic or fully automatic design also at manual gearboxes provided with high and low gear, the gears of which, thus, are doubled. For exemplifying this, in FIG. 16 an electric diagram over the device according to the invention is shown for use at a ten-gear gearbox or rather at a five-gear gearbox with high and low gear.

In FIG. 16 the device is shown in a gear shifting phase, in which the shift point cam 88 is located between the shift point breakers 100-5 and 100-6, i.e. the shift point breakers for the fifth and sixth gear, and the coupling breaker 98 closes the circuit 113 to the electric valve 114 of the clutch, while the high/low gear breaker 101 is in position to be shifted by the cam 89 for breaking a circuit 142 to an electrically controlled low gear valve 143 and close the circuit 144 to an electrically controlled high gear valve 145, i.e. for shifting from low to high gear, which takes place between the fifth and the sixth gear. The said two valves 143 and 145 are connected to the high-pressure conduit 43 through a conduit 146, which is provided with a valve 147 located in the gear-box and being of such design, that it permits air to pass through at neutral position. The valves 143 and 145 further are connected each to one side of the piston 149 of the high/low gear cylinder 148 through a conduit 150 and, respectively, 151.

When now by additional turning of the axle 25 of the distributor by means of the gear shift lever 3 the high/-low gear breaker 101 is shifted, the current to the low gear valve 143 is interrupted, and the valve assumes its other position and via the conduit 150 evacuates one side of the piston. After the circuit 142 has been broken, the circuit 144 to the high gear valve 145 is closed, which valve thereby assumes its other position, in which it connects the high-pressure conduit 146 to the conduit 151. Thereby the piston 149 on its side not evacuated is exposed to the higher pressure and is moved to its other end position for engaging the high gear. When the piston leaves its low gear end position, i.e. the position shown in FIG. 16, by an inductive transducer 152 a circuit 153 between the circuit 142 and one contact pin of the shift point breaker 100-5 is broken, and first when the piston 149 has assumed its high gear end position, an inductive transducer 154 closes in a similar way a circuit 155 between the circuit 144 and one contact pin of the shift point breaker 100-6. It is hereby ensured that, even when the shift point breaker 100-5 or 100-6 is closed, the side position valves 5a,5b and the shift point valves 6a,6b remain without current until the piston 149 of the high/low gear cylinder has assumed its respective end position, and thereby neither the fifth gear nor the sixth gear can be engaged unless said piston 149 has assumed the respecfive end position.

When this has taken place, and the shift point breaker 100-6 is actuated by the cam 88, the circuit 155 all the way to the circuit 126 is closed, and thereby the side position valve 5a adjusts the shifter 9 to the side position for the sixth gear, whereafter the pressure transducer 127 in the aforedescribed way closes the circuit 128 so that the relay 129 functions and causes the shift point 6a to engage the sixth gear and the turning of the valve cone 21 of the clutch lock valve to the position shown in FIG. 8h, whereby the conduit 69 is evacuated. It is here to be observed that, even if the coupling breaker 98, which at this embodiment is located between the shift point breakers 100-5 and 100-6 for the fifth and sixth gear, with its contact pin 98a in this position is located in the depression 87a of the coupling cam disc in FIG. 16, and thus has broken the circuit 113 to the electric valve 114 of the clutch, this valve still can be supplied with current over the circuit 122, which as in FIG. 15 is connected to the circuit 113 directly after the coupling breaker 98, and which passes over the neutral position breaker 100-N and the breaker or contact 123 controlled by the motor speed via the pulse counter 124, which contact at this embodiment is arranged so as to close the circuit 122 when the motor speed drops below a predetermined number of revolutions, for example 600 rpm, and to break said circuit when the motor speed exceeds a predetermined number of revolutions, for example 1200 rpm. This implies, thus, that when the motor speed, for actuation of the electric valve 114 of the clutch and for moving the clutch into traction position, must be increased by widening the throttle to at least 1200 rpm, because first then the contact 123 breaks the circuit 122 and thereby the current to the electric valve 114, so that this valve is shifted for evacuating the conduit 66 and thereby for returning the clutch to traction position. Traction position damping hereby is effected over the two throttle valves 125, in addition to the reverse gear, first gear and second gear, also at the sixth gear to the tenth gear, in that the circuit 153 is broken as soon as the piston 149 of the high/low gear cylinder leaves the low gear position.

Besides at shifting to the reverse gear, first gear, fourth gear and fifth gear, also at shifting to the sixth gear, ninth gear and tenth gear some of the side position valves 5a and 5b must be actuated. For this purpose, at the embodiment shown in FIG. 16 the shift point breakers 100-6, 100-9 and 100-10 are connected to the shift point breakers 100-1, 100-4 and, respectively, 100-5 each through a circuit 156, while the shift point breakers 100-7 and 100-8 for the seventh and, respectively, eighth gear are connected to the shift point breakers 100-7 and, respectively, 100-3 each through a circuit 157. For engaging the reverse gear the contact 141 must be closed, as mentioned above.

In FIG. 15 as well as in FIG. 16 a clutch pedal 158 is shown, which normally need not be used and, therefore, can be excluded, but it must be available and be used at vehicle combinations having more than one motor (see FIG. 18) in order to effect simultaneous and synchronous gear shifting of the gearboxes of these motors.

For obtaining fully automatic shifting with the gear shifting device according to the present invention, it is necessary at the embodiment shown in FIGS. 15 and 16 to provide, besides an automatic shift mechanism comprising, for example, reverse gear position, parking position, neutral position, drive position and one or two additional forward gear positions, only a means, for example a speed control means, which controls a rotary cylinder coupled to the axle 85 of the distributor for turning, in response to the speed and load, the axle 85 of the distributor and its cams 86–89 for automatic shifting to a suitable gear. It is, however, more suitable to equip the gear shifting device with a minicomputer, which is fed with information on speed, throttle opening, power drawn, which can be measured in the induction manifold of the motor, and fuel consumption, and which on the basis of this information calculates a suitable gear at a certain moment and produces control impulses to electric valves intended for shifting to the selected gear either directly to said valves or indirectly via the microbreakers 100. When using a minicomputer, thus, the distributor 84 can be abandoned.

The gear shifting device according to the invention advantageously can be used also at passenger cars. For exemplifying this, FIG. 17 shows a coupling diagram over an embodiment of the present gear shifting device for semi-automatic shifting of a four-gear gearbox of a passenger car, which gearbox in a simply way by a so-called split means 160 is provided with high and low gear and, thus, can be an eight-gear gearbox.

At this embodiment, as at the embodiment shown in FIG. 7, the conduits 68 and 69 to and from the clutch lock valve 22 are connected on both sides of the shift valve 65, so that at declutching, i.e. when the coupling breaker 98 closes the circuit 113 to the electric valve 65 of the clutch, the higher operating pressure is permitted to enter not only the conduit 66 and the pressure bell 67, but also the conduit 69, and thereby finally the piston of the shift valve 65 is exposed to the same pressure on both its sides and is centered for blocking the conduit 66 and thereby for locking the clutch in declutched position until the gear intended has been engaged in the gearbox. The gears, furthermore, at this embodiment are located so that the pistons of the side position cylinder must be moved to the side position shown in FIG. 8a for engaging the reverse gear, and to the side position shown in FIG. 8b for engaging the third gear and the fourth gear. For engaging the first gear and second gear, thus, the side position cylinder need not be actuated. Traction position damping is provided for both the reverse gear and the first gear. This embodiment for semi-automatic shifting substantially operates in the same way as the embodiment according to FIG. 15 and, therefore, need not be described in greater detail. It is to be pointed out, however, that, as the electric valve 103 in the embodiment according to FIG. 15 has been excluded at the embodiment according to FIG. 17, and thereby also the circuit 102, the neutral position breaker 100-N in FIG. 17 is single-acting.

As regards the split means 160, it is coupled to a high/low gear cylinder 161, which through conduits 162 and 163 is connected to an electric valve 164, which through a conduit 165 is connected to the conduit 50, and to which a circuit 166 is connected having a contact 167, preferably located at the gear shift lever 3, for the high and low gear.

For engaging the high gear, the contact 167 is actuated and thereby the circuit 166 is closed and the electric valve is adjusted so as to evacuate the conduit 163 and thereby one side of the piston of the high/low gear cylinder, and connects the conduit 165, which in this position is evacuated through the coupling valve 53, to the conduit 162 to the other side of the piston. As soon as the gear shift lever 3 is moved to a new shift point, declutching is effected in the aforedescribed way, and thereby the higher operating pressure is coupled in the conduit 50 and, thus, in the conduits 165 and 162 for moving the piston of the high/low gear cylinder to the high gear position. Kick-down from high gear to low gear is effected in a corresponding manner by actuating the contact 167 so as to break the circuit 166.

When, for example, the high gear, i.e. the sixth gear, is to be engaged directly from the second gear, the contact 167 is actuated in the above way so as to cause the valve 164 to evacuate the conduit 163 and to connect the conduit 162 to the conduit 165. Thereafter a foot-operated contact 168 is actuated which closes the circuit 122 and thereby the circuit 113 to the electric valve 114 of the clutch, which valve effects the declutching and then pressure in the conduits 50, 165 and 162 for engaging the high gear. When then the foot-operated contact 168 is released, the circuit 122,113 is broken, and the clutch returns to the traction position.

At the embodiments shown in FIGS. 1–18 the pressure governors 41, which are set for the pressure intended by the knobs 172 shown schematically, are interconnected through a conduit 170, which is shown in FIGS. 7 and 17. Said conduit 170, more precisely, extends from the upper chamber 171 of the pressure governor, which governor is provided for the higher operating pressure, to the conduit outgoing from the pressure governor 41 provided for the lower operating pressure. Hereby the advantage is obtained that the pressure difference between the higher and the lower operating pressure substantially is held constant even when one or the other pressure for some reason changes upward or downward.

In FIGS. 19 and 20 a further embodiment of the present gear shifting device is shown which is coupled to six-gear manual gearbox of known type, which is provided with a so-called split gear, of which gearbox only its so-called shift or side position axle 201 is shown. On said axle 201 the shifter (not shown) of the gearbox is arranged to be moved, depending on the selected gear, first into one of the four side possition points D,E,F and G by linear displacement of the axle 201 and then, by turning the axle 201, to be moved to the intended shift point for engaging the selected gear in the gearbox. For the linear displacement of the shift axle, and therewith its shifter, to the intended side position point, the gear shifting device comprises a side position cylinder 202, which by its piston rod 203 is connected to the shift axle 201, and for turning the shift axle, and therewith the shifter, to the intended shift point the gear shifting device comprises a shift point cylinder 204, which by its piston rod 205 is hingedly connected to a rotary joint 206, which by means of splines or the like is attached non-rotatably on the shift axle. The shift axle, thus, can move relative to the rotary joint in its longitudinal direction. The shift point cylinder 204 at its other end preferably is hingedly attached to the housing of the gearbox or to some other fixed point, and the side position cylinder 202 can be mounted in a suitable way on the housing of the gearbox.

The side position cylinder 202 at the embodiment shown in FIGS. 19-24 comprises three pistons 207,208 and 209, each located in a cylinder space 210,211 and, respectively, 212 in the cylinder 202, of which pistons the piston 207 is rigidly connected to its piston rod 203, while the two other pistons 208 and 209 are supported movably on the piston rod 203, and, more precisely, on a narrow portion 203a of the piston rod, to which portion also the piston 207 is attached, as shown in FIG. 23.

The side position cylinder 202 is assembled of three pieces screwn together, viz. an end wall piece 202a, in which the cylinder space 212 for the piston 209 is formed, an intermediate piece 202b, in which the cylinder space for the piston 208 is formed and which is provided with a partition wall 202b', which defines the cylinder spaces 211 and 212 from each other and in which the piston rod is slidably mounted with its narrow portion 203a, and a terminal end wall piece 202c, in which the cylinder space 210 for the piston 207 is formed and which is provided with a circular shoulder 213 facing toward the piston 208 and acting as a limit stop for the piston 208, the other limit stop of which consists of the partition wall 202b'. Like the piston 209, the limit stop of which consists of said partition wall and end wall piece 202a, the piston 208 is arranged so as to assume one or the other of two end positions, and between its end positions has a stroke corresponding to the distance between the side position points of the gearbox. As there is no partition wall between the cylinder spaces 210 and 211, the piston 208 acts in both its end positions as a limit stop for the piston 207, the other limit stop of which consists of the terminal end wall piece 202c. In order to have a space between the pistons 207 and 208 even when the piston 207 is in its end position against the piston 208, the piston 208 is formed with a central portion 14 extended to the piston 207, which central portion, thus, constitutes the limit stop proper for the piston 207 and prevents the pistons from being moved closely adjacent one another. The distance between the piston 207 and the end portion 214 in the position shown in FIG. 24, in which position the piston is in an intermediate position, is the same as between the piston and the terminal end wall piece 202c and corresponds to the distance between the side position points of the gearbox.

In the position shown in FIG. 23 the piston 209 is held pressed against the end wall piece 202a, and the piston 208 is held pressed against the shoulder 213 of the terminal end wall piece by a constant upper operating pressure, which acts on the high pressure sides of the pistons 208 and 209 facing toward each other, and which at the embodiment shown is assumed to be 6.6 kp/cm$^2$, while the piston 207, which can be caused to assume four different positions, is held in the intermediate position shown in FIG. 23 by a constant lower operating pressure prevailing in the space between the pistons 207 and 208 and thereby acting on the low-pressure sides of said pistons, which operating pressure at the embodiment shown is assumed to be half the higher operating pressure. As long as the pressure on the high-pressure side of the piston 207 is zero, the lower operating pressure acting on the low-pressure side of the piston tends to move the piston 207 and therewith the piston rod 203 to the left in FIG. 23, but is obstructed by the piston 209, by which the piston rod 203 abuts in the transition 215 between its narrow and wide portion. Thereby the piston 207 is held in the intermediate position shown in FIG. 23, which position corresponds to the side position point F for the third and fourth gear.

When the upper operating pressure on the high-pressure side of the piston 209 is evacuated, the lower operating pressure acting on the low-pressure side of the piston 7 is capable to move the piston 207 to its end position against the terminal end wall piece 202c, and thereby the piston 209 is moved to its other end position against the partition wall 202b' and, thus, is adjusted to the side position point C for the fifth and sixth gear. For adjusting the side position point E and D for the first gear and second gear and, respectively, reverse gear, the piston 207 on its high-pressure side is exposed to the upper operating pressure, and thereby the piston 207 is moved to its end position against the projecting portion 214 of the piston 208, and the piston 208 thereby being in its left-hand end position in FIG. 23, the side position point E is adjusted, but when the piston 208 is in its right-hand end position, the side position point D for the reverse gear is adjusted. It is to be observed that at the movement of the piston 207 against the piston 208, the lower operating pressure between these pistons is maintained at the same constant level by means, for example, of a pressure reduction valve or the like (not shown).

The shift point cylinder 204, which is arranged, after the intended side position point has been adjusted by the side position cylinder, to turn the shift axle 201 and therewith the shifter for engaging the intended gear in the gearbox, comprises two pistons 217 and 218 located each in a cylinder space 219 and, respectively, 220. The piston 218 is rigidly connected to the piston rod 205 of the shift point cylinder, while the other piston 217 is movable relative to the piston rod 205, as appears from FIG. 21, and is supported on an axle journal 222 movably mounted in an end wall piece 221 of the cylinder. The piston rod 205 is mounted movably in the other end wall piece 223 of the cylinder and in an intermediate piece 224, which defines the cylinder spaces 219 and 220 from one another. In the position shown in FIG. 21, the neutral position, the piston rod 205 with its free end abuts the piston 217, which for this purpose is formed with a depression 225 in its side facing toward the intermediate piece 224, and is held in abutment to the piston 217 by the lower operating pressure, which constantly acts on the low-pressure side of the piston 216, i.e. its side facing toward the end wall piece 223. The piston 217 on its side in the neutral position shown in FIG. 21 is held abutting the intermediate piece 224 by the upper operating pressure, which constantly acts on the high-pressure side of said piston, i.e. on its side facing toward the end wall piece 221. Since this pressure exceeds the lower operating pressure acting on the low-pressure side of the piston 218, the piston 218 is held in the neutral position centered in its cylinder space 220, with the possibility of being moved in one or the other direction for turning the shift axle 201 for engaging the intended gear in the gearbox.

The said upper and lower operating pressures are maintained at the intended constant level each by a pressure vessel 227 and, respectively, 228, which via a filter 229, adjustable pressure reduction valves 230 and a compressed air conduit 231 are connected to a common compressed air producer (not shown) of the vehicle. The compressed air vessel 227 for the upper or higher operating pressure is connected through a high-pressure conduit 232 to the cylinder space 219 of the shift point cylinder on the high-pressure side of the piston thereof, and to the cylinder spaces 210, 211 and 212 of the side position cylinder on the high-pressure side of the respective piston via branch conduits 233, 234 and 235, which are provided each with an electrically controlled operating valve 236, 237 and, respectively, 238. The valves 237 and 238 normally are open for maintaining the higher operating pressure on the high-pressure sides of the pistons 208 and 209, while the valve 236 normally is held closed and in this position evacuates the cylinder space 210 on the high-pressure side of the piston, so that the pressure thereon is zero.

The high-pressure conduit 232 further is connected to an input A of an electrically controlled operating valve 239, which normally is held closed, as shown in FIG. 20, and the output B of which, which in closed position of the valve is evacuated, is connected through a conduit 240 including a shift valve 241 to an input A of two normally closed electrically controlled shift point valves 242 and 243. The output D of the valve 242 is connected via a conduit 244 to the cylinder space 220 of the shift point cylinder on the high-pressure side of the piston 218, while the output D of the other shift point valve 243 is connected via a conduit 245 to the other cylinder space 219 of the shift point cylinder on the low-pressure side of the piston 217.

The compressed air vessel 228 for the lower operating pressure is connected through a low-pressure conduit 247 to the cylinder space 220 of the shift point cylinder on the low-pressure side of the piston thereof and to the space of the side position cylinder between the pistons 207 and 208 and to the shift valve 241.

A compressed air conduit 248 for supply of compressed air for operating the clutch is provided, which conduit is shown coupled to the ingoing compressed air conduit 231 before the filter 229 and extends to an input A of a normally closed electrically controlled coupling valve 249, and at the embodiment shown in FIGS. 19 and 20 to an input A of two electrically controlled normally closed operating valves 250 for operating the engagement and disengagement of the split gear portion of the gearbox, i.e. the low and high gear portion.

The output B of the coupling valve 249 is connected through a conduit 251 to an input A of a clutch lock valve 252 located in direct connection to the shift point cylinder 204, the output B of said lock valve being connected through a conduit 253 to the conduit 251 via a shift valve 254. Said valve 254 in its turn is connected through a conduit 255 to the pressure oil tank 256 of the clutch.

The said clutch lock valve 252 comprises, as appears from FIG. 21, a movable slide which consists of the piston rod 205 of the shift point cylinder and which for this purpose is formed with a relatively wide groove 257 extending all about. In the neutral position shown in FIG. 21 the groove 257 is located directly in front of the input A and communicates with a passageway 258, which is formed in a valve housing 259 enclosing the piston rod 205, and which with its other end opens into a groove 260 widened to the piston rod and extending all about, which groove is located in the side of the valve housing facing toward the piston rod. Said groove 260 in its turn communicates with a groove 261 formed in the outside of the valve housing and extending all about, which groove 261 is located directly in front of and communicates with the output B of the clutch lock valve. Said output B is located in a cylindric casing 262, which closes the groove 261 and encloses a part of the valve housing and which with a flange is screwn on the end wall piece 223 of the shift point cylinder. At the other flanged end of the casing the valve housing 259 is screwn. At the end of the valve housing 259 a sliding sleeve 263 for the end portion 264 of reduced diameter of the piston rod is attached, and between said end portion and the sliding sleeve 263 a sealing sleeve 265 is attached. In the valve housing 259 an evacuation port 266 is located, which in all positions of the piston 218 communicates with a space 267 located between the end portion 264 of the piston rod and the valve housing 259. In the position shown in FIG. 21, i.e. the neutral position, said space 267 shall have an axial length which at least corresponds to the stroke of the piston 218 from its intermediate position in FIG. 21 to the end positions. A passageway in the piston rod 205 opens, with the or more apertures 268, which in all positions of the piston 218 communicate with the evacuation port 266 via the space 267, into said space and is connected via openings 270 to two grooves 271 and 272, which extending all about are located in the outside of the piston rod for connecting the output B of the clutch lock valve to the evacuation port 266 in each of the end positions of the piston, i.e. in the shift points. In FIG. 22 such a shift point, more precisely the right-hand shift point of the piston is shown, in which position, thus, the groove 272 communicates with the groove 260 in the valve housing 259, whereby the output B is evacuated via the port 266. The input A of the clutch lock valve, however, in this position is held closed by a portion 273 on the piston rod, and a corresponding portion 274 is provided on the other side of the groove 257 for closing the input A of the clutch lock valve in the other shift point, in which the output B, thus, communicates with the evacuation port 266 at the groove 272 in the piston rod.

At the embodiment shown in FIGS. 19 and 20 the gear shifting device is operated electrically by means of a control system adapted for semi-automatic gear shifting, which system is schematically illustrated in FIG. 19. This embodiment, of course, also can be arranged for manual shifting with or without preselection of the gears or for fully automatic shifting in accordance with embodiments described previously.

Said semi-automatic control system, as shown in FIG. 19, comprises a coupling cam disc 276 located in a distributor (not shown) and rotatable by means of the gear shift lever 275, which disc in FIG. 19 is shown spread and arranged for co-operation with a coupling breaker 277 fixed relative to the cam disc 276, which breaker closes a circuit 278 to the coupling valve 249 when the pin 277a of the breaker is actuated by a projection 276a on the cam disc, and breaks said circuit when the pin 277a enters a depression 276b in the cam disc 276. In said distributor, further, a shift cam 279 is provided which is turned simultaneously with the coupling cam disc and is located directly in front of a number of shift point breakers 300 (300-B, 300-1 a.s.o.) corresponding in number to the number of gears and a neutral position breaker 300-N, which breakers 300 are arranged to be engaged and disengaged in response to the position of the shift cam.

In FIG. 19 the gear shifting device is shown in the neutral position, in which the coupling current circuit 278 is interrupted and the neutral position breaker 300-N is disengaged. It is assumed that the first gear is to be engaged. For this purpose the gear shift lever is turned downward in FIG. 19, and thereby also the coupling cam disc 276 is turned, and so is the shift point cam 279, in the direction indicated by the arrow 280 in FIG. 19. Before the shift point cam 279 has left the neutral position breaker, the coupling breaker 277 is closed by the projection 276a of the coupling cam disc and closes the circuit 278 to the coupling valve 249. Thereby this valve is caused to open and to connect the high-pressure conduit 248 to the conduit 255 to the pressure oil tank 256 of the clutch for effecting declutching of the clutch, and to the conduit 251 to the input A of the clutch lock valve. As this input in the neutral position communicates with the output B, thus, the higher operating pressure will prevail also in the conduit 253, whereby a pressure transducer 281 set for a relatively low pressure, for example 0.25 kp/cm$^2$, caused to close a circuit 282 from a current source 283, for example a battery, to a coupling control lamp 284, which thereby is coupled-in and indicates that the declutching procedure has started. To the circuit 282 are connected each of the shift point breakers 300 except the netural position breaker 300-N, and also a circuit 285 is connected which via the electrically controlled operating valve 239 is drawn to a make-contact 286 and carries current first when the make-contact 286 is actuated by the declutching lever 287 of the clutch, which takes place first at fully disengaged clutch. When the clutch is disengaged, the make-contact 286 is actuated and first thereafter the circuit 285 carries current, whereby the control valve 239 is opened and connects the high-pressure conduit 248 to the conduit 240 all the way to the shift point valves 242 and 243, which in this position are closed. The shift valve 241, between which and the control valve 239 a throttling can be located, hereby is caused to block the connection to the low-pressure conduit 247.

At the same time as the coupling cam disc 276 is turned, also the shift point cam 279 is turned from the neutral position breaker 300-N to the shift point breaker 300-1 for the first gear, which thereby is closed and closes a circuit 288 to the side position valve 236 of the side position cylinder. Hereby this valve is opened, and the piston of the side position cylinder on its high-pressure side is exposed to the higher operating pressure and thereby is moved to its end position, corresponding to the side position point E for the first and the second gear, against the projection 214 of the piston 208 remaining in its left-hand end position in FIG. 23. Hereby the shifter is set in said side position point E.

When the pressure in the branch conduit 233, in which a pressure transducer 289 is located which is set for a pre-determined pressure, for example 6.0 kp/cm$^2$, exceeds said pressure, the pressure transducer 289 is actuated and closes a circuit 290 to a relay 291, which thereby is engaged and in its turn closes a circuit 292 to the shift point valve 242, whereby this valve opens and exposes the piston 218 of the shift point cylinder on its high-pressure side to the higher operating pressure. The piston 218 and its piston rod 205 thereby are moved to the left in FIG. 21 and to the right in FIG. 20, whereby the shift axle 201 with shifter is turned and engages the first gear in the gearbox.

When the piston rod 205 enters this shift point, the input A of the clutch lock valve is closed by the piston rod portion 273, while its output B is evacuated through the evacuation port 266. Thereby the pressure in the conduit 253 connected to the output B is lowered, and when it drops below the pressure for which the pressure transducer 281 is set, the pressure transducer 281 is caused to break the circuit 282. As this circuit also is connected to the coupling valve 249 between said circuit and a diode 293, also the current to the coupling valve 249 is disconnected—in this position the coupling breaker 277 has already broken by means of the coupling cam disc the circuit 278 to the coupling valve 249, which thereafter is supplied with current via the circuit 282—and the coupling valve 249 thus is caused to again assume its position shown in FIG. 20, in which position the conduits 255 and 251 are evacuated via the output B of the coupling valve. Hereby the air pressure in the pressure oil tank 256 of the clutch drops, and the clutch can return to traction position.

When the shift point cam 279 leaves the neutral position breaker 300-N, this breaker closes a circuit 294 between the declutching circuit 278 and an idle run contact 295, which is controlled by a pulse counter 296 in response to the motor speed, so that it declutches the vehicle at idle run revolution of the motor, which implies, that the circuit 294 does not carry current at a number of revolutions higher than the intended idle run number of revolutions. In the circuit 294 a contact 297 for manual connection and disconnection of the circuit 294 as desired is provided, which contact preferably is located in the driver's cab. At the same time as the shift point breaker 300-1 is coupled-in by the shift point cam 279, also a circuit 298 to an electrically controlled operating valve 299 in a traction position damper is closed, which generally is indicated by 301. The said circuit 299 is connected to the shift point breakers 300 for at least the lower gears, for example the reverse gear, the first gear, the second gear and the third gear, as shown in FIG. 19, but, of course, traction position damping can be obtained for all gears by connecting the circuit 298 to all shift point breakers 300. Said operating valve 299, as is most clearly apparent from FIG. 25, is coupled into a conduit 302 between the pressure oil tank 256 of the clutch and an input/output A of the control cylinder 303 of the clutch, which input/output A leads directly into the cylinder 303 on the high-pressure side of its piston 304. The operating valve 299 is shunted through a shunt conduit 304 with a check valve 305, which permits oil to flow from the pressure oil tank 256 to the input/output A of the control cylinder, but not in the opposite direction through the shunt conduit 304, whereby oil, which at the return of the clutch to traction position is pressed out through the input/output A of the control cylinder, must flow through the valve 299 from its input A to its output B or from its input A to its output C. The latter output is connected to the conduit 302 between the valve 292 and the pressure oil cylinder 256 via a conduit 306, which includes two throttlings 307 and 308, of which the latter one is a needle valve or similar throttle valve which is controlled in response to the position of the gas pedal or the motor speed, so that the degree of throttling increases with increased motor speed, i.e. the higher the motor speed, the more the flow through the throttle valve 308 is throttled. Hereby a very soft coupling-in of the clutch is obtained, without any jerks, and the clutch pedal need not be used, although this is shown in the Figures.

In the operating cylinder 303 of the clutch, in one end wall piece 31/an input/output B is located which via a conduit 309 communicates with the conduit 302 and which extends into a sleeve 312, which is located movably in a cylindric hole 311 in the end wall piece 310 and open to the piston 304 of the operating cylinder, via a groove 313 formed in the end wall piece and enclosing the sleeve and a number of radial holes 314 in the sleeve 312. Internally in the sleeve 313 close to its open end a cylindrical seat 315 is formed, the axial width or length of which corresponds to the slipping or coupling-in distance of the clutch. Through said seat extends in the position shown in FIG. 25 a piston rod 316 connected to the piston 304, which rod is provided with a traction position piston 317 having such dimension that it sealingly can pass through the seat 315. The position of the sleeve in relation to the traction position piston 317 can be changed by means of an adjusting screw 319 which can be locked by a locking nut 318, by means of which adjusting screw, thus, the traction position can be adjusted.

At declutching oil is pressed into the cylinder 303 besides through the input/output B via the sleeve 312, which thereby is caused to abut the adjusting screw 319 and thereafter is held pressed against the same even when the traction position piston 317 passes through the seat 315 of the sleeve during the movement of the piston 304 from its end position shown in FIG. 25 to its other end position marked by the line 320 in FIG. 25, and in which the clutch is entirely declutched. In this end position then the piston 304 is held until the coupling valve 349 after engagement of a gear is adjusted by the pressure transducer 281 to the position shown in FIG. 20 for evacuating the compressed air a.o. in the conduit 255. Thereby the oil pressure in the hydraulic system of the clutch is reduced so that the return spring of the clutch is capable to return the piston 304 of the declutching cylinder 303 for engaging the clutch. Hereby oil is pressed out from the cylinder 303 through the input/output A and the input/output B via the sleeve 312 until the traction position piston 317 enters its seat 315 and blocks the connection through the sleeve 312. This takes place when the clutch starts functioning. This position is marked by the line 321 in FIG. 25, and as the connection through the sleeve 312 and input/output B now is held closed by the traction position piston, oil can flow out only through the input/output A, whereby the movement of the piston is braked, and a soft coupling-in of the clutch is obtained. When a low gear is concerned, the oil, as mentioned before, will flow from the input/output through the conduit 305, in which the flow is throttled by the throttle valve 307 and by the throttle valve 308 controlled in response to the motor speed. This also contributes to a soft engagement of the clutch, free of jerks.

When the clutch is engaged entirely, and full traction position has been assumed, which position is marked by the line 322 in FIG. 25, the traction position piston 317 leaves its seat 315, and thereby the connection through the sleeve 312 and input/output B again is opened, and the piston 304 thereafter is moved relatively quickly to its end position.

At the beginning of the coupling-in procedure, i.e. when the piston 304 of the operating cylinder leaves its left-hand end position in FIG. 25, also the declutching lever 287 returns, which causes the make-contact 286 to break the circuit 285, and thereby the operating valve 239 is shifted to the position shown in FIG. 25, whereby its output B is evacuated, and thereby the shift valve 241 is shifted so that the low-pressure conduit 247 is connected to the conduit 240. The piston 218 of the shift point cylinder, thus, on its high-pressure side is exposed to the lower operating pressure until the next gear shifting takes place.

It is now assumed that shifting is to take place to the second gear. The gear shift lever 275 is moved to the shift point of the second gear, which is marked by the pointer 323, whereby the coupling cam disc 276 actuates the coupling contact 277, which closes the circuit 278 and thereby the point E by movement of the piston 207. At the same time the pressure transducer 289 connects the circuit 290, whereby the relay 124 engages and closes a circuit 125 to the shift point valve 243, which thereby is opened and exposes the piston 217 of the shift point cylinder on its low-pressure side to the higher operating pressure, whereby the two pistons 217 and 218 are moved to their left-hand end position in FIG. 21 for engaging the second gear in the gearbox by turning the shift axle 201 and its shifter. Thereafter the clutch is engaged in the way described above.

In principle each shifting takes place in the way described above, so that no further examples need to be set forth. It is, however, to be pointed out that for engaging the reverse gear first a contact 326 must be depressed manually for closing the circuit 288 to the side position valve 236, which thereby is opened for exposing the piston 207 of the side position cylinder to the higher operating pressure. The relay 324 hereby is not actuated, but when the reverse position breaker 300-B is closed a circuit 328 connected to a relay 327 is closed to the side position valve 327, whereby this is closed. Thereby the pressure in the branch conduit 234 and on the high-pressure side of the piston 208 of the side position cylinder is evacuated, and first thereby the side position point D for the reverse gear is engaged. When the pressure in the branch conduit 234 is lower than a predetermined value, for example 0.25 kp/cm², a pressure transducer 329 closes a circuit 330, and thereby the relay 327 is caused to close the circuit 325 to the shift point valve 204, which thereby is opened and effects the engagement of the reverse gear.

As in the branch conduit 234, to the branch conduit 235 a pressure transducer 231 is connected which is actuated when the pressure in said conduit drops below a predetermined value, for example 0.25 kp/cm², and thereby closes a circuit 332 to a relay 333 connected to the shift point breaker for the sixth gear for closing the circuit 325 to the shift point valve 243. A corresponding relay 334 is connected to the shift point breaker for the fifth gear for closing the circuit 292 to the shift point valve 242. The two shift point breakers 300 for the fifth gear and the sixth gear are via a circuit 236, to which the relays 234 and 235 are connected, connected to the side position valve 238 for controlling the same.

In FIG. 24 a side position cylinder is shown only by way of example which is intended for a gearbox with three side position points, and which therefore is provided only with two pistons. The piston 208 at the embodiment shown in FIG. 24 is not required here.

In the circuit 282 a relay 335 is located which normally is closed and thus holds the circuit 282 closed. When the motor speed drops to idle run revolution, the circuit 294 as mentioned above carries current, and thereby the clutch is engaged via the circuit 278 and the coupling valve 249, and at the same time the relay 335 is disengaged, which in its turn breaks the circuit 282, whereby all gears, the shift point breakers of which are located after the relay 335 in the circuit 282, are disengaged. The drive now can select any gear, and when he then increases the motor speed, the gear thus selected is engaged automatically in that the circuit 294 is broken.

For illustrating a further application of the gear shifting device according to the present invention, in FIG. 18 a vehicle combination with two separate motors and gearboxes is shown, one located in the traction vehicle and the other one on the trailer coupled after the traction vehicle. By the gear shifting device according to the present invention it is rendered possible in a simple and efficient way to simultaneously and synchronously shift the gears in the gearboxes of both motors and also to disengage one or the other of the motors and effect traction only by one. It is hereby possible without great costs to bring about vehicle combinations having a loading capacity of up to 120 tons. The present invention is not restricted to what is described above and shown in the drawings, but can be altered and modified in many different ways within the scope of the invention idea defined in the attached claims. It may be mentioned, for example, that at fully automatic control of the gear shifting procedure by computer or the like the gearbox need not be synchronized.

For this purpose a pulse transmitter can be arranged on the motor and on the outgoing shaft of the gearbox, which transmitter registers the respective number of revolutions in the form of signals, which pass to the minicomputer, which on the basis of this information selects the gears in question.

During the gear shifting procedure, an adjusting means manages the motor speed. When gear shifting is to take place, the motor first is relieved whereby a previously engaged gear easily leaves its shift point. The adjusting means manages the number of revolutions of the motor so that it agrees with the gear being engaged. The adjusting means then is disengaged, and the gas pedal thereafter acts as usual for foot control. In this way a rapid and jerkless gear shifting is obtained, and the clutch must be used only at start and stop, which implies that its service life is increased substantially. As unsynchronized gearboxes can be used, the gearboxes are much cheaper and, besides, have a lighter weight, at the same time as the fuel consumption is reduced because no synchronization work is required.

What I claim is:

1. A gear shifting device for a manual gearbox having a shifter, the shifting device comprising a side position cylinder for controlling the shifter in a sideways movement and a shift point cylinder for controlling the shifter movement perpendicular to the sideways movement, said cylinders having piston rods connected to said shifter and arranged perpendicular to each other for controlling its movement corresponding to a selected gear for its entering in the gearbox, said cylinders each comprising at least two pressure-medium actuated pistons connected to each other by a connecting rod, the pistons having a high pressure side and a low pressure side, said pistons being movable to one of two end positions for displacement of the piston rod of the respective cylinder in one of two directions, characterized in that the gearbox in a neutral position has one of the pistons in each cylinder centered in its cylinder chamber by the other piston, said other piston, by actuation from a first operating pressure at its high-pressure side, being held in one of its end positions, and that in the neutral position said one piston is at its low pressure side permanently actuated by a second operating pressure being greater than atmospheric and lower than the first operating pressure, said one piston being movable from its centered position to one of its two end positions together with said other piston in the respective cylinder, by the first operating pressure at selected sides of said one piston and said other piston carried out by a side position valve disposed on the side position cylinder and a shift point valve disposed on the shift point cylinder respectively, where the shift point valve admits the first operating pressure to the pistons of the shift point cylinder only after declutching, and that a clutch lock means is arranged to, depending on the motion of the piston of the shift point cylinder, stop the return of a clutch to engagement until the selected gear has been engaged in the gearbox.

2. A device as defined in claim 1, characterized in that the piston rods (11,203,14,205) of said cylinders are arranged perpendicularly relative to one another.

3. A device as defined in claim 1, wherein the gearbox is provided with a plurality of side position points and in that the side position cylinder (2a,202) includes one piston less than the number of side position points in the gearbox, and that one of said pistons is rigidly connected to its piston rod (11,203), while the remaining pistons are mounted movably on said piston rod.

4. A device as defined in claim 1 or 2, characterized in that for controlling the side position cylinder (2a,202) and the shift point cylinder (2b,204), means is included for adjusting the pressure acting in the cylinders.

5. A device as defined in claim 2 or 3, characterized in that in a neutral position of the side position cylinder, from which position the shifter can be moved in one direction or the other, one piston (15,207) of the side position cylinder is held centered in its cylinder space and in this position is exposed on one side to a substantially constant predetermined lower operating pressure, while the other piston (16,209) in this position is in one end position and is exposed to a predetermined upper operating pressure.

6. A device as defined claim 1, characterized in that in the neutral position of the shift point cylinder, from which position the shifter can be swung in one direction or the other, one piston (29,218) of the shift point cylinder is held centered in its cylinder space (32,220) and is exposed on one side to a substantially constant predetermined lower operating pressure, while the other piston (28,217) in this position is in one end position and is exposed on its side opposite to the firstmentioned piston to a predetermined upper operating pressure, which against the action of the lower operating pressure holds the pistons of the shift point cylinder in said neutral position.

7. A device as defined in claim 5, characterized in that the said operating pressures are the same for the two cylinders, and that the upper one preferably is twice as high as the lower one.

8. A device as defined in claim 1, characterized in that said means for preventing the movement of the piston rods before declutching and the return of the clutch before engagement of a gear in the gearbox consists of a clutch lock valve (22,252) with a valve means, which in response to the piston rod of either the side position cylinder or shift point cylinder is movable for connecting and disconnecting a pressure required for actuating the clutch.

9. A device as defined in claim 1, characterized in that the pressures acting on the pistons of said two cylinders are adjustable by means of valves controlled by the gear lever of the gearbox or by a minicomputer, which automatically manages gear shifting in response to information on at least speed or load.

10. A device as defined in claim 1, characterized in that it comprises traction position damping means (106,301), which are engaged at the shifting to at least lower gears and preferably also to the reverse gear for effecting traction position damping.

* * * * *